(12) United States Patent
Mizutani et al.

(10) Patent No.: US 9,030,349 B2
(45) Date of Patent: May 12, 2015

(54) MOVING OBJECT DETECTION SYSTEM

(75) Inventors: Akiyoshi Mizutani, Nagoya (JP);
Koichiro Suzuki, Yokohama (JP); Gaku Takano, Yokohama (JP)

(73) Assignee: DENSO CORPORATION, Kariya (JP)

( * ) Notice: Subject to any disclaimer, the term of this patent is extended or adjusted under 35 U.S.C. 154(b) by 470 days.

(21) Appl. No.: 13/477,441

(22) Filed: May 22, 2012

(65) Prior Publication Data

US 2012/0299766 A1    Nov. 29, 2012

(30) Foreign Application Priority Data

May 25, 2011    (JP) .................................. 2011-117092

(51) Int. Cl.
| | |
|---|---|
| *G01S 13/00* | (2006.01) |
| *G01S 13/08* | (2006.01) |
| *G01S 13/42* | (2006.01) |
| *G01S 13/93* | (2006.01) |

(Continued)

(52) U.S. Cl.
CPC ................ *G01S 13/42* (2013.01); *G08G 1/166* (2013.01); *G08G 1/16* (2013.01); *G08G 1/015* (2013.01); *G01S 13/93* (2013.01); *G01S 7/2923* (2013.01); *G01S 7/354* (2013.01); *G01S 13/58* (2013.01); *G01S 13/726* (2013.01); *G01S 13/931* (2013.01); *G01S 2013/9375* (2013.01); *G01S 2013/9321* (2013.01); *G01S 2013/9325* (2013.01); *G01S 2013/9346* (2013.01)

(58) Field of Classification Search
CPC ........... G08G 1/00; G08G 1/015; G08G 1/16; G08G 1/166; G08G 1/167; G01S 13/93; G01S 13/931; G01S 2013/93; G01S 2013/931

USPC ...................... 342/27, 28, 29, 41, 70–72, 118
See application file for complete search history.

(56) References Cited

U.S. PATENT DOCUMENTS 5,806,019 A * 9/1998 Ishiyama ...................... 701/300
5,955,967 A * 9/1999 Yamada ........................ 340/904

(Continued)

FOREIGN PATENT DOCUMENTS

| JP | 2007-062475 | 3/2007 |
|---|---|---|
| JP | 2009-186276 | 8/2009 |
| JP | 2010-070047 | 4/2010 |

OTHER PUBLICATIONS

Yaakov Bar-Shalom et al, "Multitarget-Multisensor Tracking: Principles and Techniques", 1995, pp. 307-319, Chapter 6.

*Primary Examiner* — Peter Bythrow
(74) *Attorney, Agent, or Firm* — Harness, Dickey & Pierce, PLC

(57) ABSTRACT

In a system, a detecting module cyclically detects positional information of reflection points of received echoes. A sampling module cyclically samples, from the detected reflection points for each cycle, first and second reflection points. The first and second reflection points are expected to be reflection points of the respective first and second reflective portions of a moving object in front of the system. A first determining module determines whether a distance between the first and second reflection points varies over time. A second determining module determines that the first and second reflection points correspond to reflection points of the respective first and second reflective portions of a single moving object when it is determined that the distance between the first reflection point and the second reflection point is substantially invariant over time.

7 Claims, 6 Drawing Sheets

(51) Int. Cl.
*G01S 13/72* (2006.01)
*G08G 1/16* (2006.01)
*G08G 1/015* (2006.01)
*G01S 7/292* (2006.01)
*G01S 7/35* (2006.01)
*G01S 13/58* (2006.01)

(56) References Cited

U.S. PATENT DOCUMENTS

| | | | |
|---|---|---|---|
| 6,275,180 B1* | 8/2001 | Dean et al. | 342/70 |
| 7,068,211 B2* | 6/2006 | Oswald et al. | 342/70 |
| 7,420,502 B2* | 9/2008 | Hartzstein et al. | 342/70 |
| 7,509,217 B2* | 3/2009 | Endoh | 701/300 |
| 7,525,478 B2* | 4/2009 | Takano et al. | 342/145 |
| 7,889,116 B2* | 2/2011 | Harada et al. | 342/59 |
| 7,907,083 B2* | 3/2011 | Sakamoto et al. | 342/70 |
| 8,686,893 B2* | 4/2014 | Watanabe et al. | 342/70 |
| 2003/0142007 A1* | 7/2003 | Ono et al. | 342/70 |
| 2004/0246167 A1* | 12/2004 | Kumon et al. | 342/70 |
| 2005/0285773 A1* | 12/2005 | Hartzstein et al. | 342/70 |
| 2006/0187111 A1* | 8/2006 | Uchino | 342/70 |
| 2006/0262007 A1* | 11/2006 | Bonthron et al. | 342/70 |
| 2009/0060279 A1* | 3/2009 | Hata et al. | 382/104 |
| 2009/0102698 A1* | 4/2009 | Ichiyanagi et al. | 342/70 |
| 2010/0019954 A1* | 1/2010 | Mizutani et al. | 342/147 |
| 2010/0073216 A1* | 3/2010 | Sakamoto et al. | 342/70 |
| 2010/0228482 A1* | 9/2010 | Yonak | 701/301 |
| 2011/0221628 A1* | 9/2011 | Kamo et al. | 342/70 |
| 2013/0093614 A1* | 4/2013 | Tokoro | 342/109 |

* cited by examiner

FIG.2A
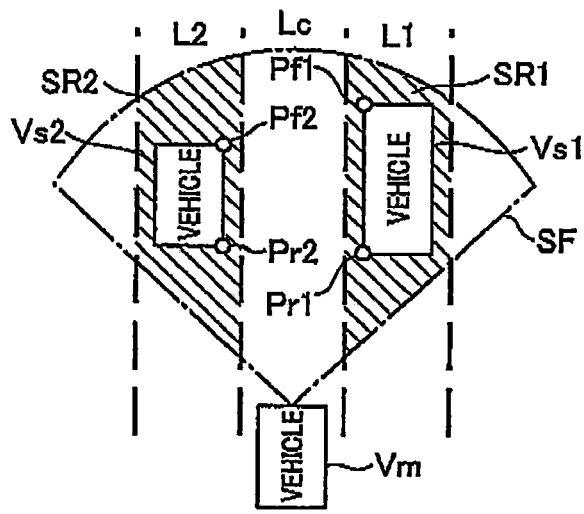
FIG.2B
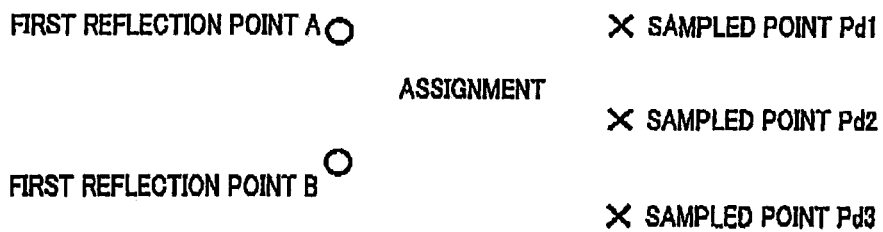
FIRST REFLECTION POINT A ○       ✕ SAMPLED POINT Pd1
ASSIGNMENT       ✕ SAMPLED POINT Pd2
FIRST REFLECTION POINT B ○       ✕ SAMPLED POINT Pd3
FIG.2C
ASSIGNMENT HYPOTHESES
$\theta_1 | Z(k)$ :    A-1,    B-2,    FA-{3}
$\theta_2 | Z(k)$ :    A-2,    B-1,    FA-{3}
$\theta_3 | Z(k)$ :    A-1,    B-3,    FA-{2}
$\theta_j | Z(k)$ :    A-1,    B-*,    FA-{2,3}
$\theta_k | Z(k)$ :    A-*,    B-1,    FA-{2,3}
$\theta_0 | Z(k)$ :    A-*,    B-*,    FA-{1,2,3}

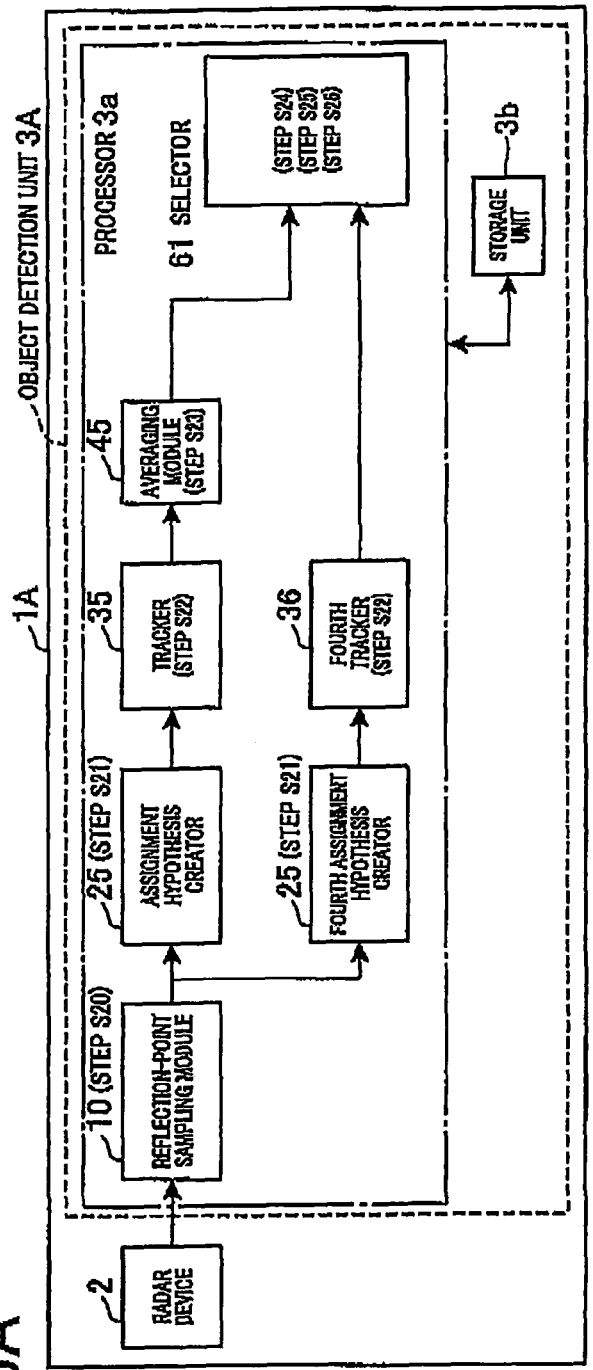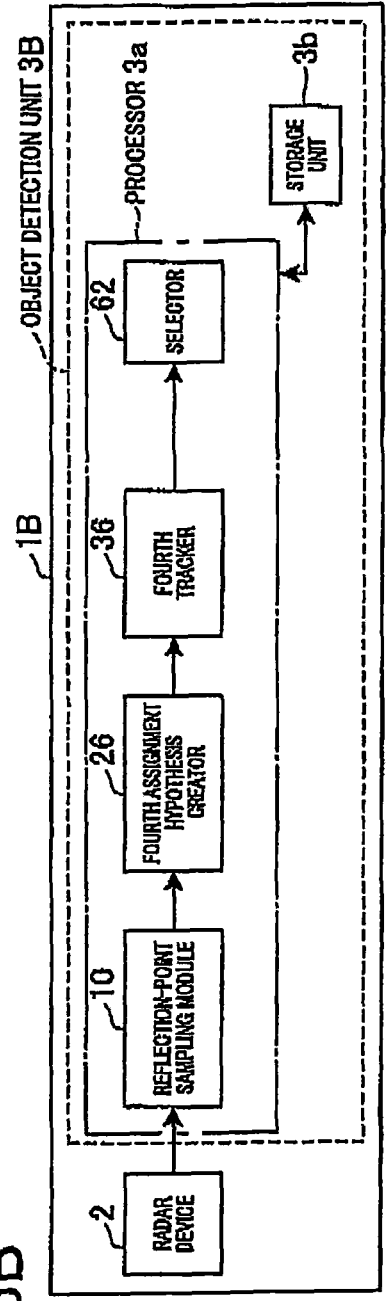

VELOCITY $V_s$ [m/s]

$$Z_n = \begin{bmatrix} Z_{fn} \\ Z_{rn} \end{bmatrix}$$

MOVING OBJECT DETECTION SYSTEM

CROSS REFERENCE TO RELATED APPLICATIONS

This application is based on and claims the benefit of priority from Japanese Patent Application 2011-117092 filed on May 25, 2011, the disclosure of which is incorporated in its entirety by reference.

TECHNICAL FIELD

The present disclosure relates generally to moving object detection systems that emit a search wave, receives echoes based on the search wave, and detects the moving objects based on the received echoes.

BACKGROUND

Moving object detection systems are installed in motor vehicles in order to improve their driving safety. A typical moving object detection system installed in a motor vehicle transmits a radar wave in front of the motor vehicle, and receives echoes from moving objects in front of the motor vehicle; these echoes are generated based on the radar wave. The mobile object detection system detects the moving objects based on the received echoes.

Such a moving object detection system using echoes based on an emitted radar wave may detect a plurality of reflection points in a single moving object; the plurality of reflection points have reflected a radar wave transmitted from the moving object detection system. This may cause the moving object detection system to misrecognize the plurality of reflection points as a plurality of different moving objects in front of the motor vehicle. In order to reduce the occurrence of such misrecognition, one technical approach is disclosed in Japanese Patent Application Publication No. 2009-186276.

The technical approach is designed to define a region in front of the vehicle, and select reflection points in the plurality of detected reflection points located within the region; the rate of transient change in the velocity of one of the selected reflection points is substantially identical to that of transient change in the velocity of the other thereof.

The technical approach is also designed to merge the selected reflection points with each other and recognize the combined reflection points as detected results from a single moving object.

SUMMARY

However, the aforementioned technical approach may misrecognize, as a single moving object, different moving objects located at any time within the region and having substantially the same velocity.

In view of the circumstances set forth above, one aspect of the present disclosure seeks to provide moving object detection systems, which are designed to address such a problem set forth above.

Specifically, an alternative aspect of the present disclosure aims to provide such moving object detection systems capable of reducing the occurrence of misrecognition of a plurality of moving objects as a single moving object, thus improving the accuracy of detecting moving objects.

According to a first exemplary aspect of the present disclosure, there is provided a moving object detection system for transmitting a search wave and detecting moving objects in front thereof from received echoes based on the search wave. Each of the moving objects has a predetermined pair of first and second reflective portions for the search wave in a moving direction thereof. The moving object detection system includes a detecting module that cyclically detects, from the received echoes, positional information of reflection points of the received echoes, and a sampling module that cyclically samples, from the detected reflection points for each cycle, a first reflection point and a second reflection point The first and second reflection points are expected to be reflection points of the respective first and second reflective portions of a moving object in front of the moving object detection system. The moving object detection system includes a first determining module that determines whether a distance between the first reflection point and the second reflection point varies over time. The moving object detection system includes a second determining module that determines that the first and second reflection points correspond to reflection points of the respective first and second reflective portions of a single moving object in front of the moving object detection system when it is determined that the distance between the first reflection point and the second reflection point is substantially invariant over time.

For example, let us assume a situation where a first moving object is running in front of the moving object detection system, a second forward moving object is running in front of the moving object detection system while approaching the first moving object, and thereafter, the first moving object and the second moving object are running at substantially the same velocity. Under the situation, let us consider a first case where the moving object detection system of this first exemplary aspect detects the positional information of a reflection point of the second reflective portion of the first moving object as a first reflection point, and detects the positional information of a reflection point of the first reflective portion of the second moving object as a second reflection point.

In the first case, because the distance between the first reflection point and the second reflection point varies over time, the first determining module determines that the distance between the first reflection point and the second reflection point varies over time. Thus, the second determining module determines that the first and second reflection points does not correspond to reflection points of the respective first and second reflective portions of a single moving object in front of the moving object detection system.

On the other hand, let us consider a second case where the moving object detection system of this first exemplary aspect detects the positional information of a reflection point of the first reflective portion of the first moving object as a first reflection point, and detects the positional information of a reflection point of the second reflective portion of the first moving object as a second reflection point.

In the second case, because the distance between the first reflection point and the second reflection point is invariant over time, the first determining module determines that the distance between the first reflection point and the second reflection point is invariant over time. Thus, the second determining module determines that the first and second reflection points correspond to reflection points of the respective first and second reflective portions of a single moving object in front of the moving object detection system.

Thus, the moving object detection system according to the first exemplary aspect reduces the occurrence of misrecognition of a plurality of moving objects as a single moving object, thus improving the accuracy of detecting moving objects.

In a first embodiment of the first exemplary aspect of the present disclosure, the first determining module includes a first calculating module that calculates, at a current cycle, an estimation of positional information of each of the first and second reflection points with a first scenario that the distance between the first reflection point and the second reflection point is fixed to a value, and calculates a first probability that a first value of the positional information of each of the first and second reflection points detected by the detecting module at the next cycle is assigned to a reflection point of a corresponding one of the first and second reflective portions based on the calculated estimation of the positional information of a corresponding one of the first and second reflection points in the first scenario. The first determining module includes a second calculating module that Calculates, at the current cycle, an estimation of positional information of each of the first and second reflection points with a second scenario that the distance between the first reflection point and the second reflection point varies over time, and calculates a second probability that a second value of the positional information of each of the first and second reflection points detected by the detecting module at the next cycle is assigned to a reflection point of a corresponding one of the first and second reflective portions based on the calculated estimation of the positional information of a corresponding one of the first and second reflection points in the second scenario. The first determining module includes an evaluating module that evaluates the first scenario based on the first probability, and evaluates the second scenario based on the second probability. The first determining module includes a determining module that compares a first result of the evaluation of the first scenario with a second result of the evaluation of the second scenario, and determines whether the distance between the first reflection point and the second reflection point varies over time based on a result of the comparison.

The moving object detection system according to the first embodiment of the first exemplary aspect determines whether the distance between the first reflection point and the second reflection point is substantially invariant over time by simply comparing the result of the evaluation of the first scenario with the result of the evaluation of the second scenario.

In a second embodiment of the first exemplary aspect of the present disclosure, the first calculating module is configured to calculate, at the current cycle, an estimation of the positional information of each of the first and second reflection points for each of a plurality of first scenarios as the first scenario. The plurality of first scenarios respectively have different values as the value to which the distance between the first reflection point and the second reflection point is fixed. The first calculating module is configured to calculate the first probability that the first value of the positional information of each of the first and second reflection points detected by the detecting module at the next cycle for each of the plurality of first scenarios is assigned to a reflection point of a corresponding one of the first and second reflective portions based on the calculated estimation of the positional information of a corresponding one of the first and second reflection points in a corresponding one of the first scenarios. The evaluating module is configured to evaluate the first evaluation for each of the plurality of the first scenarios based on the first probability for a corresponding one of the plurality of first scenarios.

The moving object detection system according to the second embodiment of the first exemplary, aspect can select one of the plurality of the first scenarios; the selected first scenario is the best in the plurality of first scenarios. Thus, it is possible to obtain the distance between the first reflection point and the second reflection point corresponding to the selected first scenario.

In a third embodiment of the first exemplary aspect of the present disclosure, it is assumed that: a moving direction of the moving object detection system is referred to as a direction of y coordinates, a coordinate of the first reflection point in the direction of y coordinates at a t-th cycle where t is an integer equal to or greater than 1 is referred to $y_{1t}$, an error variance of the coordinate $y_{1t}$ is referred to as $\sigma_{1k}^2$, a coordinate of the second reflection point in the direction of y coordinates at the t-th cycle is referred to $y_{2t}$, an error variance of the coordinate $y_{2t}$ is referred to as $\sigma_{2k}^2$, and the coordinates $y_{1t}$ and $y_{2t}$ are assumed to be represented by the following equations (1) and (2):

$$y_{1k} \sim N(\bar{y}_{1k}, \sigma_{1k}^2) \qquad (1)$$

$$y_{2k} \sim N(\bar{y}_{2k}, \sigma_{2k}^2) \qquad (2)$$

and the first determining module is configured to determine that the distance between the first reflection point and the second reflection point varies over time at a k-th cycle (k is an integer equal to or greater than 1) as long as the following equations (3) and (4) are established;

$$f(\gamma) = \int_{-\infty}^{\gamma} \chi_N^2(\alpha) d\alpha \qquad (3)$$

$$\sum_{t=1}^{k} \frac{(y_{1t} - y_{2t})}{(\sigma_{1t}^2 + \sigma_{2t}^2)} < f^{-1}(\gamma) \qquad (4)$$

where $\chi_N^2(\alpha)$ represents a probability density function of a chi-square distribution, $f(\gamma)$ represents a probability value, and $f^{-1}(\gamma)$ represents an inverse function of the probability value $f(\gamma)$.

The moving object detection system according to the third embodiment of the first exemplary aspect of the present disclosure makes simple its configuration in comparison to the configuration of the moving object detection system according to each of the first and second embodiments because the configuration of the first determining module is simpler than that of the first determining module of the moving object detection system according to each of the first and second embodiments.

According to a second exemplary aspect of the present disclosure, there is provided a moving object detection system for transmitting a search wave and detecting moving objects in front thereof from received echoes based on the search wave. Each of the moving objects has a predetermined pair of first and second reflective portions for the search wave in a moving direction thereof. The moving object detection system includes a detecting module that cyclically detects, from the received echoes, positional information of reflection points of the received echoes, and a sampling module that cyclically samples, from the detected reflection points for each cycle, a first reflection point and a second reflection point The first and second reflection points are expected to be reflection points of the respective first and second reflective portions of a moving object in front of the moving object detection system. The moving object detection system includes a first calculating module that produces a first scenario that a distance between the first reflection point and the second reflection point is fixed to a value, and calculates a first likelihood of the first scenario. The moving object detection system includes a second calculating module that produces a second scenario that the distance between the first reflection point and the second reflection point varies over time, and calculates a second likelihood of the second scenario. The moving object detection system includes a determining module that determines whether the first likelihood is greater than the second likelihood, and determines that the first and second reflection points correspond to reflection points of the respective first and second reflective portions of a single moving object in front of the moving object detection system when it is determined that the first likelihood is greater than the second likelihood.

In the first case under the same situation as the first exemplary aspect, because the distance between the first reflection point and the second reflection point varies over time, the determining module determines that the likelihood is equal to or smaller than the second likelihood. Thus, the determining module determines that the first and second reflection points does not correspond to reflection points of the respective first and second reflective portions of a single moving object in front of the moving object detection system.

However, in the second case under the same situation as the first exemplary aspect, because the distance between the first reflection point and the second reflection point is substantially invariant over time, the determining module determines that the likelihood is greater than the second likelihood. Thus, the determining module determines that the first and second reflection points correspond to reflection points of the respective first and second reflective portions of a single moving object in front of the moving object detection system.

Thus, the moving object detection system according to the second exemplary aspect reduces the occurrence of misrecognition of a plurality of moving objects as a single moving object, thus improving the accuracy of detecting moving objects.

In a first embodiment of the second exemplary aspect of the present disclosure, the first calculating module is configured to calculate, at a current cycle, an estimation of positional information of each of the first and second reflection points for the first scenario, calculate a first probability that a first value of the positional information of each of the first and second reflection points detected by the detecting module at the next cycle is assigned to a reflection point of a corresponding one of the first and second reflective portions based on the calculated estimation of the positional information of a corresponding one of the first and second reflection points in the first scenario, and calculates the first likelihood of the first scenario based on the calculated first probability of occurrence of the first value. The second calculating module is configured to calculate, at the current cycle, an estimation of positional information of each of the first and second reflection points for the second hypothesis, calculate a second probability that a second value of the positional information of each of the first and second reflection points detected by the detecting module at the next cycle is assigned to a reflection point of a corresponding one of the first and second reflective portions based on the calculated estimation of the positional information of a corresponding one of the first and second reflection points in the second scenario, and calculate the second likelihood of the second scenario based on the calculated second probability.

The moving object detection system according to the first embodiment of the second exemplary aspect easily calculates the first likelihood based on the first probability that a first value of the positional information of each of the first and second reflection points detected by the detecting module at the next cycle is assigned to a reflection point of a corresponding one of the first and second reflective portions based on the calculated estimation of the positional information of a corresponding one of the first and second reflection points in the first scenario, and easily calculates the second likelihood based on the second probability that a second value of the positional information of each of the first and second reflection points detected by the detecting module at the next cycle is assigned to a reflection point of a corresponding one of the first and second reflective portions based on the calculated estimation of the positional information of a corresponding one of the first and second reflection points in the second scenario.

In a second embodiment of the second exemplary aspect of the present disclosure, the first calculating module is configured to calculate, at the current cycle, an estimation of the positional information of each of the first and second reflection points for each of a plurality of first scenarios as the first scenario, the plurality of first scenarios respectively having different values as the value to which the distance between the first reflection point and the second reflection point is fixed. The first calculating module is configured to calculate the first probability that the first value of the positional information of each of the first and second reflection points detected by the detecting module at the next cycle for each of the plurality of first scenarios is assigned to a reflection point of a corresponding one of the first and second reflective portions based on the calculated estimation of the positional information of a corresponding one of the first and second reflection points in a corresponding one of the first scenarios. The first calculating module is configured to calculate the first likelihood for each of the plurality of the first scenarios based on the first probability for a corresponding one of the plurality of first scenarios.

The moving object detection system according to the second embodiment of the second exemplary aspect can select the first evaluation for one of the plurality of the first scenarios; the selected first evaluation is the greatest in the first evaluations of the plurality of the first scenarios. Thus, it is possible to obtain the distance between the first reflection point and the second reflection point corresponding to the greatest first evaluation.

The above and/or other features, and/or advantages of various aspects of the present disclosure will be further appreciated in view of the following description in conjunction with the accompanying drawings. Various aspects of the present disclosure can include or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which:

FIG. 2A is a view schematically illustrating an example of sampling regions used in the moving object detection system illustrated in FIG. 1;

FIG. 2B is a view schematically illustrating relationships between three sampled points and first and second reflection points according to the first embodiment;

FIG. 2C is a view schematically illustrating an example of assignment hypotheses created by an assignment hypothesis creator illustrated in FIG. 1;

FIG. 5A is a block diagram schematically illustrating a moving object detection system according to a second embodiment of the present disclosure;

FIG. 5B is a block diagram schematically illustrating a moving object detection system according to a third embodiment of the present disclosure;

DETAILED DESCRIPTION OF EMBODIMENT

Figure 1:
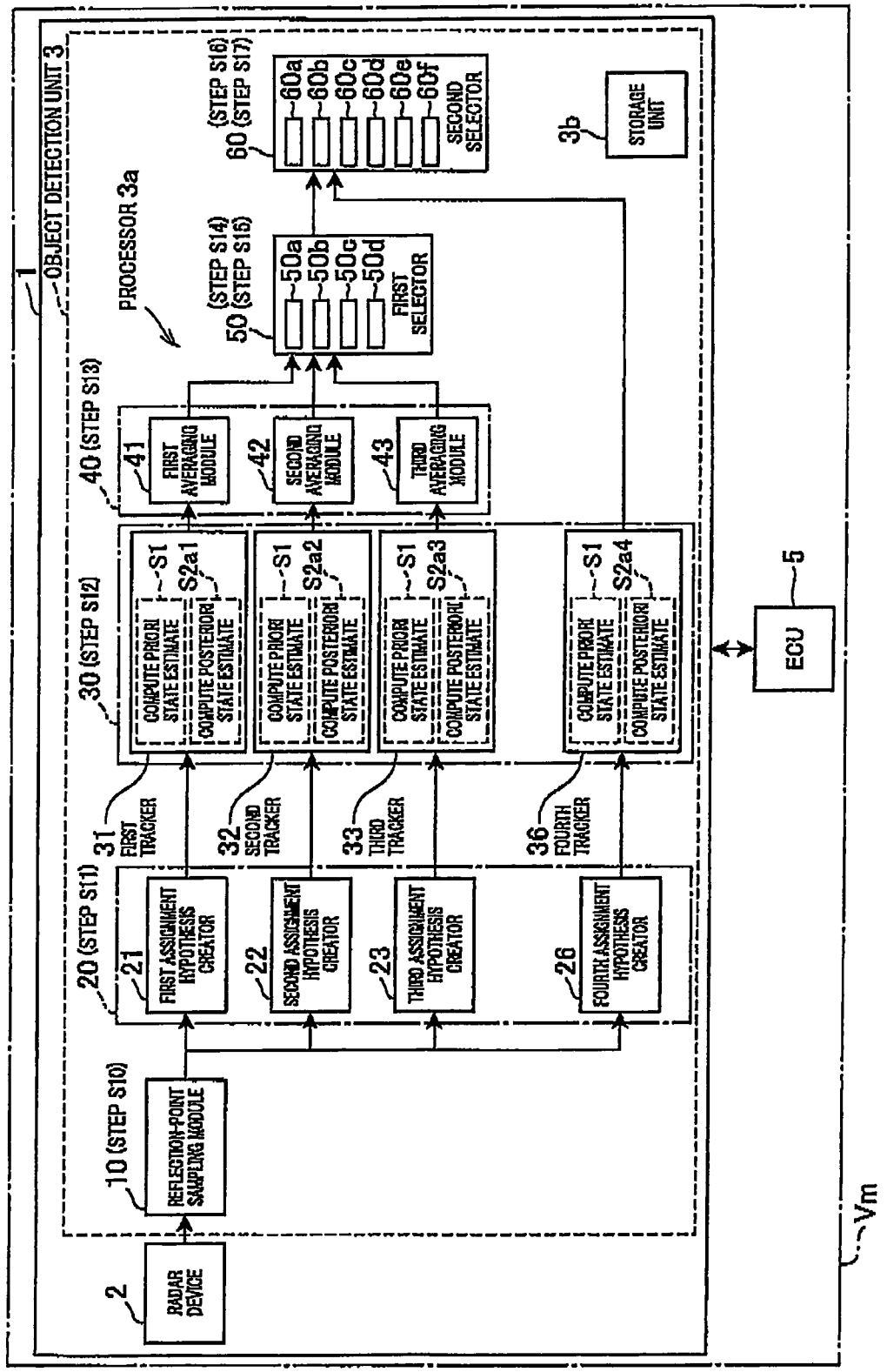
FIG. 1 is a block diagram schematically illustrating a moving object detection system according to a first embodiment of the present disclosure.

Embodiments of the present disclosure will be described hereinafter with reference to the accompanying drawings. In these embodiments, like parts to which like reference characters are assigned are omitted or simplified to avoid redundant description.

First Embodiment

An example of the overall structure of a moving object detection system 1 according to a first embodiment of the present disclosure is illustrated in FIG. 1. The moving object detection system 1 and an ECU 5 are installed in a motor vehicle (vehicle) Vm. The moving object detection system 1 is communicably connected to the ECU 5 and comprised of a radar device 2 and an object detection unit 3. The radar device 2 is communicably connected to the detection unit 3.

The radar device 2 is placed on, for example, the front end (head) of the vehicle Vm. The radar device 2 is designed to transmit a millimeter radio wave as a search wave via a transmitting antenna in a forward direction of the vehicle Vm corresponding to the travelling direction thereof. The radar device 2 is designed to search a predetermined scan field SF by scanning the scan field SF using the radio wave. The scan field SF extends from the radar device 2 of the vehicle Vm in the horizontal direction parallel to a road surface on which the vehicle Vm is running in the form of, for example, a sector.

The radar device 2 is designed to receive echoes that are generated by reflection of the radar wave in the scan field SF, and obtain, based on the received echoes, information associated with each of a plurality of reflection points that have reflected the radar wave in the scan field SF.

Specifically, as the information associated with each of the plurality of reflection points, the radar device 2 obtains information indicative of the difference between the radar device 2 and each of the plurality of reflection points and information indicative of the azimuth of each of the plurality of reflection points relative to, for example, the travelling direction of the vehicle Vm. The information indicative of each of the reflection points will be referred to as "reflection-point positional information" hereinafter. The radar device 2 is designed to supply the reflection-point positional information of each of the reflection points to the object detection unit 3.

The object detection unit 3 is comprised of, for example, at least one processor 3a, such as at least one CPU and a DSP (Digital Signal Processor), and a storage unit 3b. The object detection unit 3 can also be composed of a digital hardwired logic circuit.

The object detection unit 3 includes a reflection-point sampling module 10, an assignment hypothesis creator group 20, a tracker group 30, an averaging group 40, a first selector 50, and a second selector 60.

Each of the modules 10, 20, 30, 40, 50, and 60 of the object detection unit 3 can be designed as an electronic hardware component of the hardwired logic circuit, a software component in a program, which causes the processor 3a to perform a corresponding specific task, a hybrid component of such hardware and software components, or the like. That is, if each module of the objection detection unit 3 is designed as a software component in a program, the processor 3a is designed to perform tasks corresponding to each module in accordance with at least one program stored in the storage unit 3b.

The reflection-point sampling module 10 is designed to sample, from the reflection-point positional information of each of the reflection points, the reflection-point positional information of reflection points within at least one predetermined sampling region (observation region) in the scan field every observation (measurement) cycle T, such as 100 ms (milliseconds) as observations (measurements). Note that a batch of observations at the k-th sampling from the start of sampling will be represented as $Z(k)$ ($k=1, 2, \ldots$).

The at least one sampling region is defined as a region in a lane adjacent to a lane in which the vehicle Vm is running; the scan field overlaps the region. For example, assuming that the vehicle Vm is running in the center lane Lac of three lanes La1, Lac, and La2 of a road (see FIG. 2A), sampling regions SR1 and SR2 are defined in the respective lanes La1 and La2; the scan field SF overlaps the sampling region SR1 in the lane La1 and the sampling region SR2 in the lane La2.

For example, if forward vehicles Vs1 and Vs2 are running in the respective sampling regions SR1 and SR2 of the lanes La1 and La2 adjacent to the center lane Lac of the vehicle Vm, the reflection-point sampling module 10 can sample, based on the reflection-point positional information of each of reflection points, the reflection-point positional information of a first reflection point (a front-end reflection point) at a front-end portion of one side of the forward vehicle Vs1, and a second reflection point (a rear-end reflection point) at a rear-end portion of the one side of the forward vehicle Vs1; the one side of the forward vehicle Vs1 is closer to the vehicle Vm than the other side of the forward vehicle Vs1. The one side of a forward vehicle (moving object) running in a lane adjacent to the lane of the vehicle Vm, which is closer to the vehicle Vm than the other side thereof, will be referred to as the near side of a forward vehicle (moving object).

Similarly, the reflection-point sampling module 10 can sample, based on the reflection-point positional information of each of the reflection points, the reflection-point positional information of a first reflection point (a front-end reflection point) at a front-end portion of the near side of the forward vehicle Vs2, and a second reflection point (a rear-end reflection point) at a rear-end portion of the near side of the forward vehicle Vs2. Note that the front-end portion and the second-end portion of the near side of a forward vehicle (forward moving object) serve as a predetermined pair of first and second reflective portions thereof in its moving direction.

Why the reflection-point sampling module 10 samples the reflection-point positional information of a pair of front-end and rear-end reflection points of a forward vehicle running in a lane adjacent to the lane of the vehicle Vm is running will be described hereinafter.

A radar wave transmitted from a radar device is basically reflected from an edge of a metallic object; the edge means a portion of a side of the metallic object, and a normal line to the portion of the side is directed to the radar device. Thus, when a forward vehicle is running in a lane adjacent to the lane of the vehicle Vm, a corner edge of the rear-end portion of the near side of the forward vehicle, that is, the near corner of the rear end of the forward vehicle serves as a rear-end reflection point that reflects a radar wave transmitted from the radar device toward the radar device. This is because a normal line to the near corner of the rear end of a forward vehicle is directed to the radar device. In addition, when a forward vehicle is running a lane adjacent to the lane of the vehicle Vm, an edge of the front-wheel house panel of the near side of the forward vehicle for the corresponding near-side front wheel, which faces the radar device, serves as a front-end reflection point that reflects a radar wave transmitted from the radar device.

That is, when a forward vehicle is running in a lane adjacent to the lane of the vehicle Vin, echoes reflected by points on the forward vehicle other than front-end and rear-end reflection points could not be directed to the radar device 2 of the vehicle Vm, so that the radar device 2 could not receive these echoes.

Note that, as described above, the radar device 2 searches the scan field using a millimeter radio wave. For this reason, the radar device 2 has a reflection-point detection resolution lower than that of a radar device (lidar) using a laser beam whose wavelength range is shorter than a wavelength range of a radio wave, such as a millimeter radio wave. Thus, the radar device 2 has a threshold intensity that allows detection of an echo that is expected to be reflected by each of a front-end reflection point and a rear-end reflection point of moving objects (forward vehicles) running in a lane adjacent to the lane of the vehicle Vm and in front of the vehicle Vm.

The reflection point sampling module 10 is therefore designed to sample, as an observation, the reflection-point positional information of each of a front-end reflection point and a rear-end reflection point of moving objects (forward vehicles) if the intensity of an echo from a corresponding reflection point is greater than the threshold intensity.

However, the reflection point sampling module 10 may sample, as an observation, the reflection-point positional information of another reflection point due to, for example, thermal noise. That is, the intensity of an echo from another reflection point may exceed the threshold intensity due to thermal noise.

Thus, the reflection-point sampling module 10 is configured to sample, as an observation, the reflection-point positional information of a reflection point at a front-end portion of forward vehicles (forward moving objects) as a first reflection point if the intensity of an echo from the corresponding reflection point is greater than the threshold intensity. Similarly, the reflection-point sampling module 10 is configured to sample, as an observation, the reflection-point positional information of a reflection point at a rear-end portion of forward vehicles (forward moving objects) as a second reflection point if the intensity of an echo from the corresponding reflection point is greater than the threshold intensity.

The assignment hypothesis generator group 20 includes first to fourth assignment hypothesis creators 21 to 23, and 26 operatively connected to the reflection point sampling module 10.

Each of the first to third assignment hypothesis creators 21 to 23 is designed to create assignment hypotheses under a corresponding one of predetermined first to third models of the dynamic of forward vehicles (forward moving objects) as tracking target. The first model represents a scenario that the distance between the first reflection point A and the second reflection point 13 of forward vehicles is fixed to a length L1. The second model represents a second scenario that the distance between the first reflection point A and the second reflection point B is fixed to a length L2. The third model represents a third scenario that the distance between the first reflection point A and the second reflection point B is fixed to a length L3. That is, each of the distances L1 to L3 is assumed to be invariant over time. The lengths L1 to L3 are different from each other. The distance L1, L2, or L3 represents a parameter indicative of the longitudinal length of forward vehicles.

In addition, the fourth assignment hypothesis creator 26 is designed to create assignment hypotheses under a predetermined fourth, model of the dynamic of forward vehicles (forward moving objects) as tracking target. The fourth model represents a scenario that the first reflection point A and the second reflection point B move individually, in other words, the distance between the first and second reflection points A and B is assumed to vary over time.

Hereinafter, assignment hypotheses will be described in detail. To facilitate the descriptions, it is assumed that three measurements of three reflection points Pd1, Pd2, and Pd3 are sampled by the radar device 2 and the reflection-point sampling module 10; these three reflection points can include the first reflection point A, the second reflection point B, and another reflection point (see FIG. 2B). The reflection points Pd1, Pd2, and Pd3 will be referred to as sampled points Pd1, Pd2, and Pd3 hereinafter.

In this assumption, each assignment hypothesis creator is designed to create hypotheses each of which represents how to assign the measurements of the sampled points Pd1, Pd2, and Pd3 to the first reflection point A and the second reflection point B using the MECE (Mutually Exclusive and Collectively Exhaustive) principle. The MECE principle is a grouping principle for separating a set of items into subsets, the choice of subsets should be mutually exclusive i.e., no subsets should represent any other subsets ("no overlaps"), and be collectively exhaustive i.e., the set of all subsets, taken together, should fully encompass the larger set of all items ("no gaps"). Note that each assignment hypothesis creator is designed to create hypotheses while considering if the first reflection point A and the second reflection point B are not sampled by the reflection point sampling module 10 and if measurements of another reflection point are sampled by the reflection point sampling module 10.

Note that reflection points other than the first reflection point A and the second reflection point B will be referred to as clutters due to thermal noise.

When the i-th assignment hypotheses for the set of observations Z(k) at the k-th sampling is referred to as "$\theta_1|Z(k)|$" (i=0, 1, 2, 3, ...), each of the assignment hypothesis creators 21, 22, 23, and 26 creates the assignment hypotheses $\theta_1|Z(k)|$ as, for example, illustrated in FIG. 2C.

Referring to FIG. 2C, for example, the first assignment hypothesis $\theta_1|Z(k)|$ is represented as the letter string of "A-1, B-2, FA-{3}". The letter string of "A-1, B-2, FA-{3}" denotes that: the sampled point Pd1 is assigned to the first reflection point A at the (k−1) sampling, the sampled point Pd2 is assigned to the second reflection point B at the (k−1) sampling, and the sampling point Pd3 is assigned to a clutter (another reflection point). The j-th assignment hypothesis $\theta_j|Z(k)|$ is represented as the letter string of "A-1, B-*, FA-{2, 3}". The letter string of "A-1, B-*, FA-{2, 3}" denotes that the sampled point Pd1 is assigned to the first reflection point A at the (k−1) sampling, and the sampling points Pd2 and Pd3 are assigned to clutter (reflection points other than the first reflection point A and the second reflection point B). The 0-th assignment hypothesis $\theta_0|Z(k)|$ is represented as the letter string of "A-*, B-*, FA-{1, 2, 3}". The letter string of "A-*, B-*, FA-{1, 2, 3}" denotes that: the sampling points Pd1, Pd2 and Pd3 are assigned to clutter.

After creation of the assignment hypotheses $\theta_1|Z(k)|$, each of the assignment hypothesis creators 21, 22, 23, and 26 is designed to calculate the event probabilities $\beta_i(k)$ of the assignment hypotheses $\theta_i|Z(k)|$ in accordance with the following equation (5):

$$\beta_1(k)=P(\theta_i(k)|Z^k) \quad (5)$$

where $\theta_1(k)$ denotes the i-th assignment hypothesis at the k-th sampling, and $Z^k$ denotes the set of batches of observations Z(k) up to and including the k-th sampling, which is represented by the following equation (6):

$$Z^k=\{Z(1),Z(2),\ldots,Z(k-1),Z(k)\} \quad (6)$$

Specifically, the event probability $\beta_i(k)$ for the i-th assignment hypothesis $\theta_1(k)$ represents the likelihood of creation of the i-th assignment hypothesis $\theta_1(k)$ when the set $Z^k$ of batches of observations Z(k) are obtained.

Next, one approach to calculate the event probabilities $\beta_i(k)$ will be described hereinafter. In this embodiment, an approach described in Chapter 5 of "Multitarget-Multisensor Tracking" written by Yaakov Bar-Shalom is used.

First, the event probabilities $\beta_1(k)=P(\theta_1(k)|Z^k)$ are represented by the following equation (7) with Bayes' formula:

$$P\{\theta_i(k)|Z^k\} = P\{\theta_i(k)|Z(k), m(k), Z^{k-1}\} \quad (7)$$
$$= \frac{1}{c} p[Z(k)|\theta_i(k), m(k), Z^{k-1}] P\{\theta_i(k)|m(k)\}$$

where p and P represent function identifiers, c is the normalization constant, and m(k) represents the number of observations at the k-th sampling.

The batch Z(k) of observations at the k-th sampling when the number of observations at the k-th sampling is m(k) is represented by the following equation (8):

$$Z(k)=\{z_1(k),z_2(k),\ldots z_{m(k)-1}(k),z_{m(k)}(k)\} \quad (8)$$

where $z_j(k)$ (j=1, 2, ... m(k)−1, and m(k)) denote the number of pieces of positional information of respective observations in the batch Z(k).

The first and second functions of the equation (7) are represented by the following equations (9) and (10):

$$p[Z(k)|\theta_i(k), m(k), Z^{k-1}] = \prod_{j=1}^{m(k)} p[z_j(k)|\theta_{ijt_j}(k), Z^{k-1}] \quad (9)$$

$$P\{\theta_i(k)|m(k)\} = \quad (10)$$
$$P\{\theta_i(k)|\delta(\theta_i), \phi(\theta_i), m(k)\} P\{\delta(\theta_i), \phi(\theta_i)|m(k)\}$$

where $t_j$ represents the first reflection point A or the second reflection point B assigned to an observation $z_j(k)$, $\delta(\theta_i)$ denotes the observed state of at least one of the first reflection point A and the second reflection point B in the i-th assignment hypothesis $\theta_1(k)$, and $\phi(\theta_i)$ denotes the number of clutter reflections in the i-th assignment hypothesis $\theta_1(k)$.

The equation (9) represents a probability that observations in the i-th assignment hypothesis $\theta_1(k)$ are detected at respective pieces of positional information $z_j(k)$ (j=1, 2, ... m(k)−1, and m(k)). The equation (10) represents a probability of the i-th assignment hypothesis $\theta_i(k)$ when the number of pieces of positional information of respective observations in the batch Z(k) is given.

The function p of the right side of the equation (9) is represented by the following equation (11):

$$p[Z(k)|\theta_i(k), m(k), Z^{k-1}] = \quad (11)$$
$$\left\{ \begin{array}{ll} f_{it_j}[z_j(k)] & \text{if } \tau_{ij}[\theta_i(k)]=1 \\ V^{-1} & \text{if } \tau_{ij}[\theta_i(k)]=0 \end{array} \right\} \prod_{j=1}^{m(k)} p[z_j(k)|\theta_{ijt_j}(k), Z^{k-1}]$$

where $\tau_{ij}$ represents a function that is 1 when an observation (positional information) $z_j(k)$ in the assignment hypothesis $\theta_1(k)$ is assigned to the first reflection point A or the second reflection point B, and is 0 when an observation $z_j(k)$ in the assignment hypothesis $\theta_i(k)$ is assigned to be clutter, and V represents the volume of the sampling region (observation region).

The function $f_{it_j}[z_j(k)]$ of the equation (11) is represented by the following equation (12):

$$f_{it_j}[z_j(k)]=N[z_j(k);\hat{z}^{t_j}(k|k-1),S^{t_j}(k)] \quad (12)$$

where the right side of the equation (12) represents the probability that a j-th observation in the i-th assignment hypothesis $\theta_1(k)$ is detected at a corresponding piece of positional information $z_j(k)$ when the corresponding piece of positional information $z_j(k)$ is assigned to the first reflection point A or the second reflection point B in Gaussian distribution with average $\hat{z}^{t_j}(k|k-1)$ and variance $S^{t_j}(k)$, and $\hat{z}^{t_j}(k|k-1)$ is an observation for target $t_j$ (the first reflection point A or the second reflection point B) at the k-th sampling; the observation being estimated at the (k−1) sampling based on the Kalman filter described later. That is, $\hat{z}^{t_j}(k|k-1)$ corresponds to an a-priori state estimate $x_{k|k-1}$ of the state vector x at the k-th sampling described later.

Specifically, the value of the right side of the equation (12) is reduced with increase in the difference between the value for the target $t_j$ predicted at the k-th sampling and an observation for the target $t_j$ predicted at the (k−1)-th sampling and an actual observation for the target $t_j$ at the k-th sampling. The probability of the observation $z_j(k)$ calculated by each of the first to third assignment hypothesis creators 21 to 23 corresponds to a first probability of each of first and second aspects of the present disclosure, and the probability of the observation $z_j(k)$ calculated by the fourth assignment hypothesis creator 26 corresponds to a second probability of each of the first and second aspects of the present disclosure.

Thus, the right side of the equation (8) is represented by the following equation (13):

$$p[Z(k) \mid \theta_i(k), m(k), Z^{k-1}] = V^{-\phi(\theta_i)} \prod_{j_1} f_{1t_{j_1}}[z_{j_1}(k)] \quad (13)$$

where $j_1$ is j meeting the equation $\tau_{ij}[\theta_1(k)]=1$.

Figure 3A:
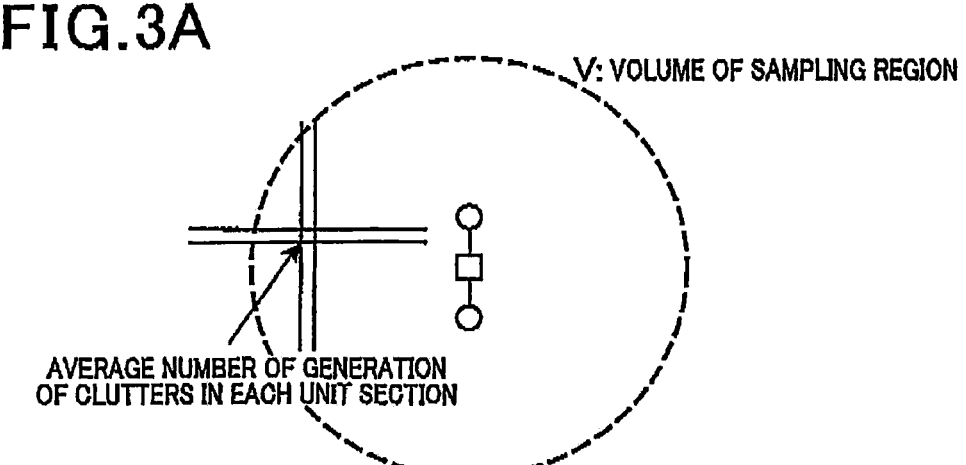
FIG. 3A is a view schematically illustrating a volume of a sampling region and an average number of clutter reflections in each unit section of the sampling region according to the first embodiment.

The $V^{-\phi(\theta_1)}$ of the equation (13) denotes the probability of the number $\phi(\theta_i)$ of clutters exists in the assignment hypothesis $\theta_1(k)$; these clutters are uniformly distributed in the observation region with the volume V (see FIG. 3A). Note that it is assumed that the number $\phi(\theta_i)$ of clutters depends on Poisson distribution expressed in the following equation (14) when the average number of generation of clutters in each unit section of the observation region is represented as $\lambda$.

$$\mu_F(\phi(\theta_i)) = \frac{e^{-\lambda V}(\lambda V)^{\phi(\theta_i)}}{\phi(\theta_i)!} \quad (14)$$

The left-side function P in the two functions P of the right side of the equation (10) is represented by the following equation (15):

$$P\{\theta_i(k) \mid \delta(\theta_1), \phi(\theta_1), m(k)\} = {}_{(m(k)}P_{m(k)-\phi(\theta_1)})^{-1} \quad (15)$$

where the right side of the equation (15) represents the inverse of the total number of the assignment hypotheses when the observed state $\delta(\theta_i)$ of each of the first reflection point A and the second reflection point B in the i-th assignment hypothesis $\theta_1(k)$ is given.

In addition, the right-side function P in the two functions P of the right side of the equation (10) is represented by the following equation (16):

$$P\{\delta(\theta_i), \phi(\theta_i) \mid m(k)\} = \mu_F(\phi(\theta_i)) \prod_t (P_D^t)^{\delta_{it}}(1 - P_D^t)^{1-\delta_{it}} \quad (16)$$

where the right side of the equation (16) represents the distribution $\mu_F(\phi(\theta_1))$ of clutters in the i-th assignment hypothesis $\theta_1(k)$ and detection/non-detection rate of each of the first reflection point A and the second reflection point B in the i-th assignment hypothesis $\theta_1(k)$. Specifically, $P_D^1$ represents the detection probability of the first reflection point A (t=A) or the second reflection point B (t=B) in the i-th assignment hypothesis $\theta_1(k)$. In addition, $\delta_{it}$ represents the observed state of the first reflection point A or the second reflection point B in the i-th assignment hypothesis $\theta_1(k)$.

Figure 3B:
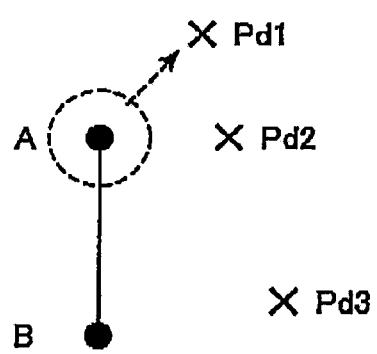
FIG. 3B is a view schematically illustrating assignment hypotheses as one example of assignment hypotheses created by an assignment hypothesis creator illustrated in FIG. 1.

For example, let us assume that the i-th assignment hypothesis $\theta_1(k)$ is represented as the letter string of "A-1, B-*, FA-{2, 3}" illustrated in FIG. 3B. In this assumption, the observed state $\delta(\theta_i)$ of the first reflection point A and/or the second reflection point B is represented by the following equation (17), and the right side of the equation (15) and that of the equation (16) are represented by the following equations (18) and (19), respectively:

$$\delta_i(\theta_i) \equiv (\delta_{i\lambda} \ \delta_{i\pi})^T = (1 \ 0)^T \quad (17)$$

$$P\{\theta_i(k) \mid \delta(\theta_i), \phi(\theta_i), m(k)\} = ({}_3P_{3-2})^{-1} \quad (18)$$

-continued $$P\{\delta(\theta_i), \phi(\theta_i) \mid m(k)\} = \mu_F(2)(P_D^A)^1 \cdot (1 - P_D^A)^{1-1} \cdot (P_D^B)^0 \cdot (1 - P_D^B)^{1-0} \quad (19)$$
$$= \mu_F(2) P_D^A (1 - P_D^B)$$

Note that where X≡Y represents that X is defined as Y.

Accordingly, each of the assignment hypothesis creators 21, 22, 23, and 26 calculates the event probabilities $\beta_i(k)=P(\theta_i(k) \mid Z^k)$ in accordance with the following equation (20):

$$P(\theta_i(k) \mid Z^k) = \frac{1}{c}({}_{m(k)}P_{m(k)-\phi(\theta_i)})^{-1} \mu_F(\phi(\theta_i)) \quad (20)$$
$$V^{-\phi(\theta_i)} \prod_{j_1} f_{1t_{j_1}}[z_{j_1}(k)] \prod_t (P_D^t)^{\delta_{it}}(1 - P_D^t)^{1-\delta_{it}}$$

where $j_1$ is j meeting the equation $\tau_{ij}[\theta_1(k)]=1$, and $\phi(\theta_i)$ denotes the number of clutters in the i-th assignment hypothesis $\theta_1(k)$.

The end-point tracker group 30 includes first to fourth trackers 31 to 33, and 36 operatively connected to the respective first to fourth assignment hypothesis creators 21 to 23, and 26.

Each of the first to fourth trackers 31 to 33 and 36 is designed to perform a state estimation task based on the well-known Kalman filter for each of the assignment hypotheses created by a corresponding one of the first to fourth assignment hypothesis creators 21 to 23, and 26 every observation cycle T assuming that the moving direction of forward vehicles is in agreement with that of the vehicle Vm. Note that the Kalman filter according to this embodiment is an algorithm designed to produce, at the k-th sampling, an a-posteriori state estimate $x_{k|k}$ of a corresponding target assignment hypothesis based on an observation (measurement) at the k-th sampling using the following state and observation equations (21) and (22):

$$x_k = F x_{k-1} + v \quad (21)$$

$$v \sim N(0, Q) \quad (21a)$$

$$z_k = H_k x_k + w \quad (22)$$

$$w \sim N(0, R) \quad (22a)$$

where $x_k$ is a true state of a corresponding target assignment hypothesis at the k-th sampling, F is the state transition model which is applied to the previous state $x_{k-1}$ at the (k−1)-th sampling, $v \sim N(0, Q)$ represents that the process noise v is assumed to be drawn from a zero mean multivariate normal distribution with covariance Q, $z_k$ is an observation (a measurement) of the state vector x at the k-th sampling, and $w \sim N(0, R)$ represents that the observation noise is assumed to be drawn from a zero mean multivariate normal distribution with covariance R.

Figure 3C:
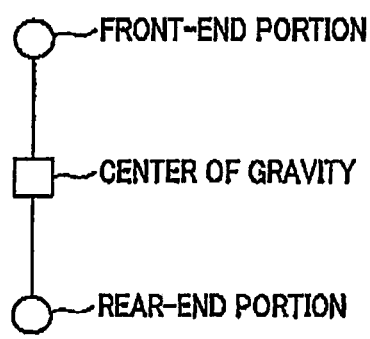
FIG. 3C is a view schematically illustrating a model of forward vehicles according to the first embodiment.

When a state vector x comprised of the velocity and the position of the center of gravity of a rigid body as a model of forward moving objects (forward vehicles), which has a length of l, a front end portion serving as the first reflection point A, and a rear-end portion serving as the second reflection point B, is assumed to express a corresponding target assignment hypothesis (see FIG. 3C), the state equation based on the Kalman filter for the state vector x is expressed by the following equations (23a) and (23b):

$$x_{k+1} = \begin{pmatrix} 1 & T \\ 0 & 1 \end{pmatrix} \begin{pmatrix} x_k \\ \dot{x}_k \end{pmatrix} + \begin{pmatrix} T^2/2 \\ T \end{pmatrix} + v \quad (23a)$$

$$v \sim N(0, \sigma_v^2) \quad (23b)$$

where $x_k$ is a true state (a true position in the moving direction) of the state vector x at the k-th sampling, $x_{k+1}$ is a true state of the state vector x at the (k+1)-th sampling, $\dot{x}_k$ represents the velocity of the state vector x at the k-th sampling, and $v \sim N(0, \sigma^2)$ represents that the process noise v is assumed to be drawn from a zero mean Gaussian distribution with covariance $\sigma^2$.

Each of the first to fourth trackers 31 to 33 and 36 is designed to compute an a-posteriori state estimate $x_{k|k}$ of the state vector x at the k-th sampling using an a-priori state estimate $x_{k|k-1}$ of the state vector x at the k-th sampling and one of the following first to third observation equations based on the Kalman filter for the state vector; the a-posteriori state estimate $x_{k|k}$ of the state vector x at the k-th sampling is a state estimate of the state vector x at the k-th sampling based on a batch of observations at the k-th sampling, and the a-priori state estimate $x_{k|k-1}$ is a state estimate of the state vector x at the k-th sampling based on batches of observations prior to the k-th sampling. The first to third observation equations are different from each other depending on corresponding assignment hypotheses.

Functions of each of the first to fourth trackers 31 to 33 and 36 will be described hereinafter with reference to a simple flowchart illustrated in FIG. 1.

At the (k−1) sampling, each of the first to fourth trackers 31 to 33 and 36 computes an a-priori state estimate $x_{k|k-1}$ of the state vector x at the k-th sampling in accordance with the following equation (24a) in step S1:

$$x_{k|k-1} = \begin{pmatrix} 1 & T \\ 0 & 1 \end{pmatrix} \begin{pmatrix} x_{k-1|k-1} \\ \dot{x}_{k-1|k-1} \end{pmatrix} \quad (24a)$$

where $x_{k-1|k-1}$ represents an a-posteriori state estimate of the state vector x at the (k−1)-th sampling.

When a corresponding assignment hypothesis represents that sampled points are assigned to the first reflection point A and the second reflection point B, each of the first to fourth trackers 31 to 33 and 36 is designed to use the following first observation equation (24b):

$$z_k = \begin{pmatrix} 1 & 0 \\ 1 & 0 \end{pmatrix} \begin{pmatrix} x_k \\ \dot{x}_k \end{pmatrix} + \begin{pmatrix} 1/2 \\ -1/2 \end{pmatrix} + w \quad (24b)$$

where $z_k$ is an observation (a measurement) of the state vector x at the k-th sampling, and w is expressed as the equation "$w \sim N(0, \sigma_w^2)$" representing that the observation noise w is assumed to be drawn from a zero mean Gaussian distribution with covariance $\sigma_w^2$.

In addition, innovation or measurement residual $\tilde{z}_k$ is given by the following equation (25):

$$\tilde{z}_k = z_k - \begin{pmatrix} 1/2 \\ -1/2 \end{pmatrix} - \begin{pmatrix} 1 & 0 \\ 1 & 0 \end{pmatrix} x_{k|k-1} \quad (25)$$

where $x_{k|k-1}$ is an a-priori state estimate at the k-th sampling based on observations prior to the k-th sampling.

Thus, when a corresponding assignment hypothesis represents that sampled points are assigned to the first reflection point A and the second reflection point B, each of the first to fourth trackers 31 to 33 and 36 computes an a-posteriori state estimate $x_{k|k}$ of the state vector x at the k-th sampling using the a-priori state estimate $x_{k|k-1}$ and the innovation residual $\tilde{z}_k$ expressed by the equation (25) in accordance with the following equation (25a) in step S2a1:

$$x_{k|k} = x_{k|k-1} + K\tilde{z}_k \quad (25a)$$

where K represents Kalman gain, and the Kalman gain K can be computed based an a-posteriori estimate error covariance.

When a corresponding assignment hypothesis represents that one sampled point is assigned to the first reflection point A but no sampled points are assigned to the second reflection point B, each of the first to fourth trackers 31 to 33 and 36 is designed to use the following second observation equation expressed by the following equation (26):

$$z_k = \begin{pmatrix} 1 & 0 \end{pmatrix} \begin{pmatrix} x_k \\ \dot{x}_k \end{pmatrix} + (1/2) + w \quad (26)$$

In addition, innovation or measurement residual $\tilde{z}_k$ is given by the following equation (27):

$$\tilde{z}_k = z_k - (1/2) - (1\ 0) x_{k|k-1} \quad (27)$$

Thus, when a corresponding assignment hypothesis represents that one sampled point is assigned to the first reflection point A but no sampled points are assigned to the second reflection point B, each of the first to fourth trackers 31 to 33 and 36 computes an a-posteriori state estimate $x_{k|k}$ of the state vector x using the a-priori state estimate $x_{k|k-1}$ at the k-th sampling and the innovation residual $\tilde{z}_k$ expressed by the equation (27) in accordance with the equation (25a) in step S2a2.

When a corresponding assignment hypothesis represents that one sampled point is assigned to the second reflection point B, but no sampled points are assigned to the first reflection point A, each of the first to fourth trackers 31 to 33 and 36 is designed to use the following third observation equation expressed by the following equation (28):

$$z_k = \begin{pmatrix} 1 & 0 \end{pmatrix} \begin{pmatrix} x_k \\ \dot{x}_k \end{pmatrix} - (1/2) + w \quad (28)$$

In addition, innovation or measurement residual $\tilde{z}_k$ is given by the following equation (29):

$$\tilde{z}_k = z_k + (1/2) - (1\ 0) x_{k|k-1} \quad (29)$$

Thus, when a corresponding assignment hypothesis represents that one sampled point is assigned to the second reflection point B but no sampled points are assigned to the first reflection point A, each of the first to fourth trackers 31 to 33 and 36 computes an a-posteriori state estimate $x_{k|k}$ of the state vector x using the a-priori state estimate $x_{k|k-1}$ at the k-th sampling and the innovation residual $\tilde{z}_k$ expressed by the equation (29) in accordance with the equation (25a) in step S2a3.

On the other hand, when a corresponding assignment hypothesis represents that no sampled points are assigned to the first reflection point A and the second reflection point B, each of the first to fourth trackers 31 to 33 and 36 is designed to compute an a-posteriori state estimate $x_{k|k}$ at the k-th sampling based on innovation or measurement residual $\tilde{z}_k$ given by the following equation (30) in step S2a4:

$$\tilde{z}_k = 0 \qquad (30)$$

Thus, when a corresponding assignment hypothesis represents that no sampled points are assigned to the first reflection point A and the second reflection point B, each of the first to fourth trackers 31 to 33 and 36 computes an a-posteriori state estimate $x_{k|k}$ of the state vector x using the a-priori state estimate $x_{k|k-1}$ at the k-th sampling and the innovation residual $\tilde{z}_k$ expressed by the equation (30) in accordance with the following equation (25a) in step S2a4.

The averaging group 40 includes first to third averaging modules 41 to 43 operatively connected to the respective first to third trackers 31 to 33.

Each of the first to third averaging modules 41 to 43 is designed to calculate an average $X_k$ of the a-posteriori state estimates $x_{k|k}$ at the k-th sampling for the respective assignment hypotheses computed by a corresponding one of the trackers 31 to 33 using the event probabilities $\beta_i(k) = P(\theta_i(k)|Z^k)$ calculated by a corresponding one of the assignment hypothesis creators 21 to 23 in accordance with the following equation (31):

$$X_k = \sum_i P\{\theta_i(k) \mid Z^k\} x_{k|k}^i \qquad (31)$$

where $x_{k|k}^i$ represents the a-posteriori state estimates $x_{k|k}$ of the i-th assignment hypothesis $\theta_i(k)$.

Note that the average $X_k$ of the a-posteriori state estimates $x_{k|k}$ of each of the first to third models for the respective assignment hypotheses at the k-th sampling will be referred to as an "averaged-state estimate" hereinafter.

The averaged-state estimate $X_k$ of the a-posteriori state estimates $x_{k|k}$ at the k-th sampling for each of the first to third models represents the position and velocity of the center of gravity of the rigid body in the moving direction. Thus, each of the first to third averaging modules 41 to 43 can output, to the ECU 5, the averaged state estimate $X_k$ of the a-posteriori state estimates $x_{k|k}$ of the center of gravity of each of the first to third models at the k-th sampling, and output, to the ECU 5, the position and velocity of the first reflection point A (front-end reflection point) of a corresponding model and the position and velocity of the second reflection point B (rear-end reflection point) thereof.

The first selector 50 is operatively connected to the first to third averaging modules 41 to 43.

The first selector 50 includes a hardware or software module 50a that calculates a likelihood of each of the first to third models at the k-th sampling in accordance with the following equation (32):

$$P(M_j \mid z_k) = \sum_i \beta_{ji} \qquad (32)$$

where $P(M_j|z_k)$ represents a likelihood of each of the j-th models $M_j$ (j=1, 2, and 3) at the k-th sampling, and $\beta_{ji}$ represents the event probability of the i-th assignment hypothesis at the k-th sampling for a corresponding one of the j-th models (J=1, 2, and 3) calculated by a corresponding one of the first to third assignment hypothesis creators 21 to 23.

The first selector 50 also includes a hardware or software module 50b that stores, in the storage unit 3b, the likelihood of each of the j-th models $M_j$ (j=1, 2, and 3) at the k-th sampling.

The first selector 50 includes a hardware or software module 50c. After the store of the likelihood of each of the j-th models $M_j$ (j=1, 2, and 3) at the k-th sampling, the hardware/software module 50c integrates the likelihoods of each of the j-th models $M_j$ (j=1, 2, and 3) from the rust likelihood of a corresponding one of the j-th models $M_j$ at the first sampling to the k-th likelihood thereof at the k-th sampling using, for example, a storage area of the storage unit 3b, thus computing a model likelihood $P(M_j|Z^k)$ of each of the j-th models $M_j$ (j=1, 2, and 3) in accordance with the following equation (33):

$$P(M_j \mid Z^k) = \prod_{i=1}^{k} P(M_j \mid z_i) \qquad (33)$$

The first selector 50 includes a hardware or software module 50d. After the integration by the module 50c, the module 50d selects one of the first to third models $M_j$ (j=1, 2, and 3); the model likelihood $P(M_j|Z^k)$ of the selected one of the first to third models $M_j$ (j=1, 2, and 3) is the greatest in all the first to third models $M_j$ (j=1, 2, and 3).

The second selector 60 is operatively connected to the first selector 50 and the fourth tracker 36.

The second selector 60 includes a hardware or software module 60a that calculates a likelihood of the fourth model at the k-th sampling in accordance with the following equation (34) using the event probability of the i-th assignment hypothesis at the k-th sampling for the fourth model calculated by the fourth assignment hypothesis creator 26:

$$P(M_0 \mid z_k) = \sum_i \beta_{0i} \qquad (34)$$

where $M_0$ represents the fourth model, $P(M_0|z_k)$ represents a likelihood of the fourth model $M_0$ at the k-th sampling, and $\beta_{0i}$ represents the event probability of the i-th assignment hypothesis at the k-th sampling for the fourth model.

The second selector 60 includes a hardware or software module 60b stores, in the storage unit 3b, the likelihood of the fourth model $M_0$ at the k-th sampling.

The second selector 60 includes a hardware or software module 60c. After the store of the likelihood of the fourth model $M_0$ at the k-th sampling, the module 60c integrates the likelihoods of the fourth model $M_0$ from the first likelihood of the fourth model $M_0$ at the first sampling to the k-th likelihood thereof at the k-th sampling, thus computing a model likelihood $P(M_0|Z^k)$ of the fourth model $M_0$ in accordance with the following equation (33a):

$$P(M_0 \mid Z^k) = \prod_{i=1}^{k} P(M_0 \mid z_i) \qquad (33a)$$

The second selector 60 includes a hardware or software module 60d. After the integration, the module 60d compares the model likelihood $P(M_j|Z^k)$ of the j-th model $M_j$ (j=1, 2, or 3) selected by the first selector 50 with the model likelihood $$P(M_0 \mid z_k) = \sum_i \beta_{0i}$$

of the fourth model $M_0$.

The second selector 60 includes a hardware or software module 60e that selects one of the j-th model $M_j$ (j=1, 2, or 3) selected by the first selector 50 and the fourth model $M_0$; the model likelihood of the selected one of the j-th model $M_j$ (j=1, 2, or 3) and the fourth model $M_0$ is greater than that of the other thereof.

The second selector 60 includes a hardware or software module 60l. If the j-th model $M_j$ (j=1, 2, or 3) is selected by the module 60e, the module 60f determines that the first and second reflection points A and B determined based on the averaged-state estimate $X_k$ of the a-posteriori state estimates $x_{k|k}$ of the selected j-th model $M_j$ (j=1, 2, or 3) at the k-th sampling correspond to front-end and rear-end reflection points of a single moving object (single forward vehicle). Thus, the second selector 5 outputs, to the ECU 5, the averaged-state estimate $X_k$ of the j-th model $M_j$ (j=1, 2, or 3) selected by the module 60e and/or the reflection-point positional information of each of the first and second reflection-point candidates A and B.

The ECU 5 is designed to receive the averaged-estimate $X_k$ of the j-th model $M_j$ (j=1, 2, or 3) and/or the reflection-point positional information of each of the first and second reflection-point candidates A and B, and to perform, based on the averaged-estimate $X_k$ of the j-th model $M_j$ (j=1, 2, or 3) and/or the reflection-point positional information of each of the first and second reflection-point candidates A and B, various tasks for supporting a driver of the vehicle Vm. The various tasks include, for example, an adaptive cruise control task and a precrash task.

The adaptive cruise control task automatically controls the velocity of the vehicle Vm to keep the distance between the vehicle Vm and a moving object (forward vehicle) ahead of the vehicle Vm to a target distance; the target distance can be set by the driver using the target distance setting switch.

The precrash task controls a warning buzzer and a monitor (not shown) of the vehicle Vm to provide audible and/or visible warning to the driver of the vehicle Vm, controls brakes of the vehicle Vm to apply full braking to the vehicle Vm, and/or tightens seatbelts of the vehicle Vm when the distance between the vehicle Vm and a moving object (forward vehicle) ahead of the vehicle Vm is equal to or lower than a preset threshold distance.

For example, if the objection unit 3 is comprised of the processor 3a and storage unit 3b set forth above, the processor 3a performs a moving-object detection routine stored in the storage unit 3b. Specifically, when launching the moving-object detection routine, the processor 3a samples, from the reflection-point positional information of each of the reflection points, the reflection-point positional information of reflection points within at least one predetermined sampling region (observation region) in the scan field every observation (measurement) cycle T in step S10; this process corresponds to the functions of the reflection-point sampling module 10.

Next, the processor 3a creates assignment hypotheses $\theta_1 \mid Z(k)\mid$ for each of the first to fourth models, and calculates the event probabilities $\beta_i(k)$ of the assignment hypotheses $\theta_1 \mid Z(k)\mid$ for each of the first to fourth models in step S11; this process corresponds to the functions of the assignment hypothesis creator group 20.

Next, the processor 3a computes, every observation cycle T, an a-posteriori state estimate $x_{k|k}$ at the k-th sampling using an a-priori state estimate $x_{k|k-1}$ at the k-th sampling and the innovation residual $\tilde{z}_k$ expressed by a corresponding one of the equations (25), (27), (29), and (30) for each of the first to fourth models in step S12; this process corresponds to the functions of the tracker group 30.

Following the process in step S12, the processor 3a calculates the averaged-state estimate $X_k$ of the a-posteriori state estimates $x_{k|k}$ of each of the first to third models far the respective assignment hypotheses at the k-th sampling in step S13; this process corresponds to the functions of the averaging group 40.

Following the process in step S13, the processor 3a calculates a model likelihood $P(M_j \mid Z^k)$ of each of the j-th models $M_j$ (j=1, 2, and 3) in accordance with the aforementioned equation (33) in step S14; this process corresponds to the functions of the modules 50a to 50e of the first selector 50.

Next, the processor 3a performs a process to select one of the first to third models $M_j$ (j=1, 2, and 3); the model likelihood $P(M_j \mid Z_k)$ of the selected one of the first to third models $M_j$ (j=1, 2, and 3) is the greatest in all the first to third models $M_j$ (j=1, 2, and 3) in step S15; this process corresponds to the functions of the module 50d of the first selector 50.

On the other hand, the processor 3a calculates a model likelihood $P(M_j \mid Z^k)$ of the fourth model $M_0$ in accordance with the aforementioned equation (33a) in step S16, this process corresponds to the functions of the module 60a to 60c of the second selector 60.

Following the process in step S16, the processor 3a performs a process to:

select one of the j models $M_j$ (j=1, 2, and 3) selected by the first selector 50 and the fourth model $M_0$; the model likelihood of the selected j-th model $M_j$ (j=1, 2, or 3) and the fourth model $M_0$ is greater than that of the other thereof; and determine that the first and second reflection points A and B calculated based on the averaged-state estimate $X_k$ of the a-posteriori state estimates $X_{k|k}$ of the selected j-th model $M_j$ (j=1, 2, or 3) at the k-th sampling correspond to front-end and rear-end reflection points of a single moving object (single forward vehicle) if the j-th model $M_j$ (j=1, 2, or 3) is selected as one of the j-th model $M_j$ (j=1, 2, or 3) and the fourth model $M_0$.

This process in step S17 corresponds to the functions of the modules 60d and 60e of the second selector 60.

As described above, the moving object detection system 1 according to this embodiment is configured to calculate an a-priori state estimate $x_{k|k-1}$ of each target assignment hypothesis at the k-th sampling based on batches of observations prior to the k-th sampling every observation cycle T assuming that the distance between the first reflection point A and the second reflection point B of forward moving objects (forward vehicles) as tracking target is fixed to each of the lengths L1, L2, and L3 corresponding to the first to third models $M_j$ (M1, M2, and M3), respectively.

The moving object detection system 1 is also configured to calculate an a-posteriori state estimate $x_{k|k}$ of the state vector x of each target assignment hypothesis at the k-th sampling using the a-priori state estimate $x_{k|k-1}$ and the innovation residual $\tilde{z}_k$ every observation cycle T for each of the first to third models $M_j$ (M1, M2, and M3).

The moving object detection system 1 is further configured to calculate an average $X_k$ of the a-posteriori state estimates $x_{k|k}$ of the respective assignment hypotheses at the k-th sampling for each of the first to third models M1, M2, and M3 using the event probabilities $\beta_1(k)=P(\theta_1(k)\mid Z^k)$ calculated for a corresponding one of the first to third models M1, M2, and M3.

In addition, the moving object detection system 1 is configured to calculate a likelihood $P(M_j|z_k)$ of each of the j-th models $M_j$ (j=1, 2, and 3) at the k-th sampling using the event probability $\beta_{ji}$ of the i-th assignment hypothesis at the k-th sampling for a corresponding one of the j-th models (J=1, 2, and 3), and integrate the likelihoods $P(M_j|z_k)$ of each of the j-th models $M_j$ (j=1, 2, and 3) from the first likelihood of a corresponding one of the j-th models $M_j$ at the first sampling to the k-th likelihood thereof at the k-th sampling using, for example, a storage area of the storage unit 3b, thus computing a model likelihood $P(M_j|Z^k)$ of each of the j-th models $M_j$ (j=1, 2, and 3).

Thereafter, the moving object detection system 1 is configured to select one of the first to third models $M_j$ (j=1, 2, and 3); the model likelihood $P(M_j|Z^k)$ of the selected one of the first to third models $M_j$ (j=1, 2, and 3) is the greatest in all the model likelihoods $P(M_j|Z^k)$ of the first to third models $M_j$ (j=1, 2, and 3).

On the other hand, the moving object detection system 1 is configured to calculate an a-priori state estimate $x_{k|k-1}$ of each target assignment hypothesis at the k-th sampling based on batches of observations prior to the k-th sampling every observation cycle T assuming that, as a fourth model M0, the first reflection point A and the second reflection point B move individually.

The moving object detection system 1 is also configured to calculate an a-posteriori state estimate $x_{k|k}$ of the state vector x of each target assignment hypothesis at the k-th sampling using the a-priori state estimate $x_{k|k-1}$ and the innovation residual $\tilde{z}_k$ every observation cycle T for the fourth model M0.

The moving object detection system 1 is further configured to calculate a likelihood $P(M_0|z_k)$ of the fourth model M0 at the k-th sampling using the event probability $\beta_{ji}$ of the i-th assignment hypothesis at the k-th sampling for the fourth model M0, and integrate the likelihoods $P(M_0|z_k)$ of the fourth model $M_0$ from the first likelihood at the first sampling to the k-th likelihood thereof at the k-th sampling using, for example, a storage area of the storage unit 3b, thus computing a model likelihood $P(M_0|Z^k)$ of the fourth model $M_0$.

Then, the moving object detection system 1 is configured to compare the model likelihood $P(M_j|Z^k)$ of the selected one of the first to third models $M_1$ to $M_3$ with the model $P(M_0|Z^k)$ of the fourth model $M_0$.

The moving object detection system 1 is configured to determine that the first and second reflection points A and B correspond to front-end and rear-end reflection points of a single moving object (single forward vehicle) if the model likelihood $P(M_j|Z^k)$ of the selected one of the first to third models $M_1$ to $M_3$ is greater than the model $P(M_0|Z_k)$ of the fourth model $M_0$ based on the results of comparison.

That is, the moving object detection system 1 constructed set forth above determines whether the distance between the first reflection point A and the second reflection point B varies over time, and determines that the first reflection point candidate A and the second reflection point B correspond to front-end and rear-end reflection points of a single forward vehicle when it is determined that the distance between the first reflection point A and the second reflection point B is substantially invariant over time.

Figure 4A:
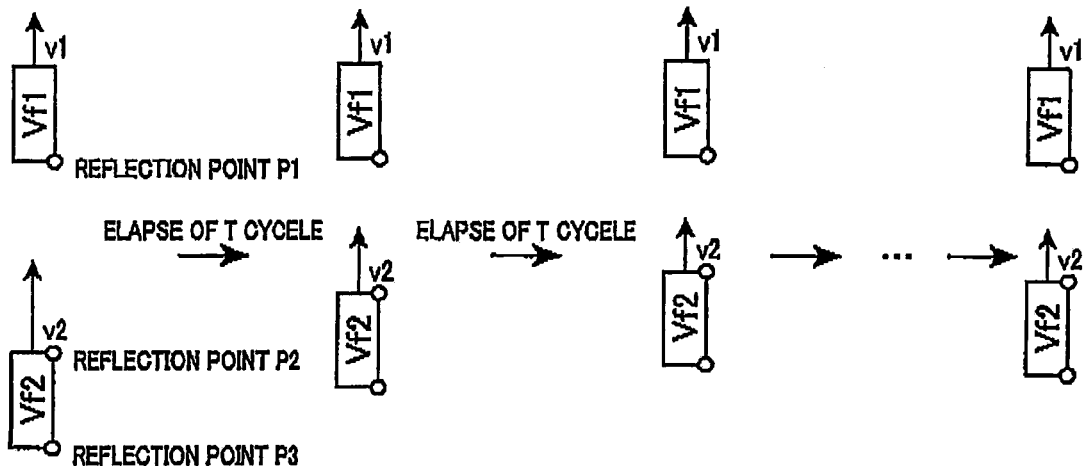
FIG. 4A is a view schematically illustrating a situation where a first forward vehicle is running in a first lane in front of a vehicle running in a second lane adjacent to a first lane, a second forward vehicle is running in the first lane in front of the vehicle while approaching the first forward vehicle, and thereafter, the first forward vehicle and a second forward vehicle are running at substantially the same velocity.

For example, let us assume a situation where a first forward vehicle Vf1 is running in a first lane in front of the vehicle Vm running in a second lane adjacent to the first lane, a second forward vehicle Vf2 is running in the first lane in front of the vehicle while approaching the first forward vehicle Vf1, and thereafter, the first forward vehicle Vf1 and the second forward vehicle Vf2 are running at substantially the same velocity (see FIG. 4A). Under the situation, let us consider that the moving object detection system 1 samples the reflection-point positional information of three-reflection points P1, P2, and P3 every sampling period T; the reflection points P1 and P3 are assigned to the second reflection point B, and the reflection point P2 is assigned to the first reflection point A.

Figure 4B:
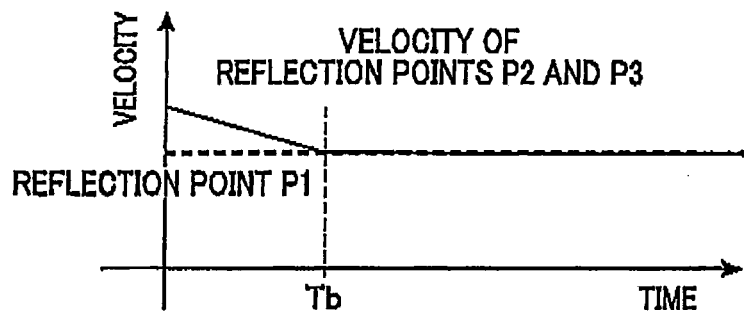
FIG. 4B is a graph schematically illustrating the transitions of the velocities of three-reflection points over time in the situation.

If the moving object detection system 1 used the technical approach disclosed in the Patent Publication No. 2009-186276 set forth above, the moving object detection system 1 could not recognize the different forward vehicles Vf1 and Vf2 because they are running at their different velocities (V1 and V2) before time Tb in FIG. 4B, and could misrecognize the different moving objects Vf1 and Vf2 as a single moving object while the different moving objects Vf1 and Vf2 are running at substantially the same velocity (V1=V2) after the time Tb in FIG. 4B. This is because the technical approach is designed to detect the first and second reflection points P1 and P2 as detected results from a single forward vehicle only after the first and second reflection points P1 and P2 (the first and second forward vehicles Vf1 and Vf2) have identical deviations (substantially zero) in velocity from each other.

Figure 4C:
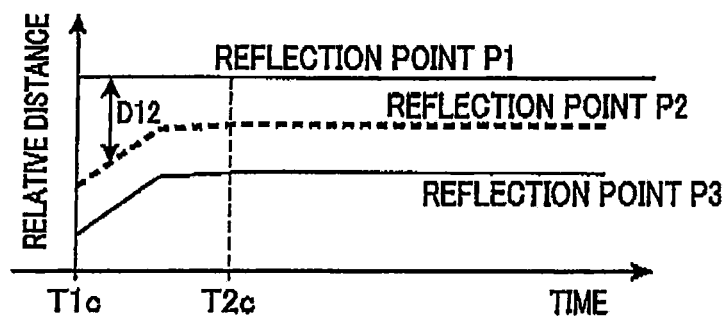
FIG. 4C is a graph schematically illustrating the transitions of the relative distances between the three-reflection points over time in the situation.

In contrast, the moving object detection system 1 according to this embodiment is able to detect that the distance D12 between the first reflection point P1 (the second reflection point B) and the second reflection point P2 (the first reflection point A) varies while the forward vehicle Vf2 (the second reflection point P2) approaches the first forward vehicle Vf1 (the first reflection point P1) during the period from time T1c to time T2c in FIG. 4C. This is because the model $P(M_0|Z^k)$ of the fourth model $M_0$ is greater than the model likelihood $P(M_j|Z^k)$ of a selected one of the first to third models $M_1$ to $M_3$ during the period from the time T1c to the time T2c so that the moving object detection system 1 detects that the first and second reflection points P1 and P2 (the second and first reflection points B and A) are reflection points from different forward moving objects (different forward vehicles).

Accordingly, the moving object detection system 1 reduces the occurrence of misrecognition of a plurality of moving objects as a single moving object, thus improving the accuracy of detecting moving objects.

The moving object detection system 1 compares the model likelihood $P(M_j|Z^k)$ of the selected one of the first to third models $M_1$ to $M_3$, which has the greatest in all the model likelihoods $P(M_j|Z^k)$ of the first to third models $M_j$ (j=1, 2, and 3), with the model $P(M_0|Z^k)$ of the fourth model $M_0$, and determines that the first and second reflection points A and B correspond to front-end and rear-end reflection points of a single moving object (single forward vehicle) if the model likelihood $P(M_j|Z^k)$ of the selected one of the first to third models $M_1$ to $M_3$ is greater than the model $P(M_0|Z^k)$ of the fourth model $M_0$ based on the results of comparison.

That is, the moving object detection system 1 determines whether the first and second reflection points A and B correspond to front-end and rear-end reflection points of a single moving object (single forward vehicle) using such a relatively simple model-likelihood comparison approach set forth above.

The moving object detection system 1 can calculate the longitudinal length of a detected forward vehicle based on the distance of the selected one of the first to third models $M_1$ to $M_3$, which has the greatest in all the model likelihoods $P(M_j|Z^k)$ of the first to third models $M_j$ (j=1, 2, and 3).

Second Embodiment

A moving object detection system 1A according to a second embodiment of the present disclosure will be described hereinafter with reference to FIG. 5A.

The structure and/or functions of the moving object detection system 1A according to the second embodiment are different from the moving object detection system 1 by the following points. So, the different points will be mainly described hereinafter.

The moving object detection system 1A includes the radar device 2 and an object detection unit 3A communicably connected thereto.

The object detection unit 3A includes the reflection-point sampling module 10, an assignment hypothesis creator 25, the fourth assignment hypothesis creator 26, a tracker 35, the fourth tracker 36, an averaging module 45, and a selector 61.

The assignment hypothesis creator 25 is operatively connected to the reflection-point sampling module 10 and designed to create assignment hypotheses under an average model of the dynamic of forward vehicles (forward moving objects) as tracking target. The average model assumes that the distance between the first reflection point A and the second reflection point B of forward vehicles is fixed to an average length La in various types of motor vehicles. How to create assignment hypotheses is substantially identical to that of each of the first to third assignment hypothesis creators 21 to 23 according to the first embodiment.

The tracker 35 is operatively connected to the assignment hypothesis creator 25 and designed to perform a state estimation task based on the well-known Kalman filter for each of the assignment hypotheses created by the assignment hypothesis creator 25 every observation cycle T. How to perform the state estimate task is substantially identical to that of each of the first to third assignment hypothesis creators 21 to 23 according to the first to third trackers 31 to 33.

The averaging module 45 is operatively connected to the tracker 36 and designed to calculate an average $X_k$ of the a-posteriori state estimates $x_{k|k}$ at the k-th sampling for the respective assignment hypotheses computed by the tracker 35 using the event probabilities $\beta_1(k)=P(\theta_1(k)|Z^k)$ calculated by the assignment hypothesis creator 25 in accordance with the equation (31) set forth above.

The selector 61 is operatively connected to the averaging module 45 and the fourth tracker 36. The selector 61 is designed to calculate a model likelihood $P(M_j|Z^k)$ of the average model models $M_a$ in accordance with the aforementioned equations (32) and (33) where j is replaced with a in the same approach as the modules 50a to 50c of the first selector 50 according to the first embodiment.

The selector 61 is also designed to calculate a model likelihood $P(M_0|Z^k)$ of the fourth model Ma in accordance with the aforementioned equations (34) and (33a) in the same approach as the modules 60a to 60c of the second selector 60 according to the first embodiment.

The selector 61 is further designed to compare the model likelihood $P(M_a|Z^k)$ of the average model $M_a$ with the model likelihood $$P(M_0 \mid z_k) = \sum_i \beta_{0i}$$

of the fourth model $M_0$, and select one of the average model $M_a$ and the fourth model $M_0$; the model likelihood of the selected model $M_a$ or $M_0$ is greater than that of the other thereof in the same approach as the modules 60d and 60e of the second selector 60.

Then, the selector 61 is designed to determine that the first and second reflection points A and B correspond to front-end and rear-end reflection points of a single forward vehicle when it is determined that the model likelihood $P(M_a|Z^k)$ of the average model is greater than the model $P(M_0|Z^k)$ of the fourth model $M_0$ based on the results of comparison.

Specifically, the processor 3a of the moving object detection system 1A samples, from the reflection-point positional information of each of the reflection points, the reflection-point positional information of reflection points within at least one predetermined sampling region (observation region) in the scan field every observation (measurement) cycle T in step S20 in the same approach as step S10.

The processor 3a creates assignment hypotheses $\theta_1|Z(k)|$ for the average model, and calculates the event probabilities $\beta_i(k)$ of the assignment hypotheses $\theta_1|Z(k)|$ for each of the average model and the fourth model in step S21 in the same approach as step S11.

Next, the processor 3a computes, every observation cycle T, an a-posteriori state estimate $x_{k|k}$ at the k-th sampling using an a-priori state estimate $x_{k|k-1}$ at the k-th sampling and the innovation residual $\tilde{z}_k$ expressed by a corresponding one of the equations (25), (27), (29), and (30) for each of the average model and the fourth model in step S22 in the same approach as step S12.

Following the process in step S12, the processor 3a calculates the averaged-state estimate $X_k$ of the a-posteriori state estimates $x_{k|k}$ of the average model for the respective assignment hypotheses at the k-th sampling in step S23 in the same approach as step S13.

Following the process in step S23, the processor 3a calculates a model likelihood $P(M_a|Z^k)$ of the average model $M_a$ in accordance with the aforementioned equation (33) in step S24 in the same approach as step S14.

On the other hand, the processor 3a calculates a model likelihood $P(M_0|Z^k)$ of the fourth model $M_0$ in accordance with the aforementioned equation (33a) in step S25 in the same approach as step S15.

On the other hand, the processor 3a calculates a model likelihood $P(M_0|Z^k)$ of the fourth model $M_0$ in accordance with the aforementioned equation (33a) in step S26 in the same approach as step S16.

Then, the processor 3a performs a process to:

select one of the average model Ma and the fourth model $M_0$; the model likelihood of the selected one of the average model $M_0$ and the fourth model $M_0$ is greater than that of the other thereof; and determine that the first and second reflection points A and B determined based on the averaged-state estimate $X_k$ of the a-posteriori state estimates $x_{k|k}$ of the average model $M_a$ at the k-th sampling correspond to front-end and rear-end reflection points of a single moving object (single forward vehicle) if the average model $M_a$ is selected as one of the average model $M_a$ and the fourth model $M_0$.

As described above, because the configuration and functions of the moving object detection system 1A according to the second embodiment are basically identical to those of the moving object detection system 1 according to the first embodiment, the moving object detection system 1A achieves the same technical effects as those of the moving object detection system 1.

Particularly, the moving object detection system 1A according to the second embodiment reduces the number of components thereof in comparison to the number of components of the moving object detection system 1. This achieves an effect of simplifying the configuration of the moving object detection system 1A, thus reducing the manufacturing cost of the moving object detection system 1A in comparison to the moving object detection system 1.

Third Embodiment

A moving object detection system 1B according to a third embodiment of the present disclosure will be described hereinafter with reference to FIG. 53.

The structure and/or functions of the moving object detection system 1B according to the third embodiment are different from the moving object detection system 1 by the following points. So, the different points will be mainly described hereinafter.

The moving object detection system 1B includes the radar device 2 and an object detection unit 33 communicably connected thereto.

The object detection unit 33 includes the reflection-point sampling module 10, an assignment hypothesis creator 25, the fourth assignment hypothesis creator 26, the fourth tracker 36, and a selector 62.

The selector 62 is operatively connected to the fourth tracker 36.

The selector 62 is designed to perform the following routine to determine whether the first and second reflection points A and B determined based on the averaged-state estimate $X_k$ of the a-posteriori state estimates $x_{k|k}$ of the fourth model $M_0$ at the k-th sampling correspond to front-end and rear-end reflection points of a single moving object (single forward vehicle).

In the routine, it is assumed that first and second position coordinates (state estimates) of the respective first and second reflection points A and B determined based on the averaged-state estimate $X_k$ of the a-posteriori state estimates $x_{k|k}$ of the fourth model $M_0$ at the k-th sampling in the moving direction of forward vehicles are expressed as $y_{1k}$ and $y_{2k}$. In addition, the first position coordinate $y_{1k}$ of the first reflection point A in the moving direction of forward vehicles is assumed to be drawn from a Gaussian distribution having mean $\bar{y}_{1k}$ and error variance $\sigma_{1k}^2$ in accordance with the following equation (35):

$$y_{1k} \sim N(\bar{y}_{1k}, \sigma_{1k}^2) \tag{35}$$

Similarly, the second position coordinate y of the second reflection point B in the moving direction of forward vehicles is assumed to be drawn from a Gaussian distribution having mean $\bar{y}_{2k}$ and variance $\sigma_{2k}^2$ in accordance with the following equation (36):

$$y_{2k} \sim N(\bar{y}_{2k}, \sigma_{2k}^2) \tag{36}$$

In addition, the following equations (37) and (38) are assumed to be established as long as the first and second position coordinates $y_{1k}$ and $y_{2k}$ of the first and second reflection points A and B in the moving direction of forward vehicles correspond to front-end and rear-end reflection points of a single moving object (single forward vehicle):

$$y_{1k} - y_{2k} \sim N(\bar{l}, \sigma_{1k}^2 + \sigma_{2k}^2) \tag{37}$$

$$\bar{l} = E[y_{1k} - y_{2k}] \tag{38}$$

where $\bar{l}$ represents an averaged length of various types of motor vehicles, and E is a given coefficient.

The equation (37) means that the subtraction of the second position coordinate $y_{2k}$ of the second reflection point B from the first position coordinate $y_{1k}$ of the first reflection point A is drawn from a Gaussian distribution having the mean $\bar{l}$ and error variance $\sigma_{1k}^2 + \sigma_{2k}^2$.

Based on the assumptions, the selector 62 is designed to determine that the first and second position coordinates $y_{1k}$ and $y_{2k}$ of the first and second reflection points A and B in the moving direction of forward vehicle correspond to front-end and rear-end reflection points of a single moving object (single forward vehicle) if the following equations (39) and (40) are established:

$$f(\gamma) = \int_{-\infty}^{\gamma} \chi_N^2(\alpha) \, d\alpha \tag{39}$$

$$\sum_{t=1}^{k} \frac{(y_{1t} - y_{2t})}{(\sigma_{1t}^2 + \sigma_{2t}^2)} < f^{-1}(\gamma) \tag{40}$$

where $\chi_N^2(\alpha)$ represents a probability density function of a chi-square distribution, $f(\gamma)$ represents an arbitrarily set probability value, such as 0.95, and $f^{-1}(\gamma)$ represents an inverse function of the probability value $f(\gamma)$.

That is, the equation (39) represents that integrating the probability density function of the chi-square distribution $\chi_N^2(\alpha)$ over a range from $\alpha = -\omega$ to $\alpha = \gamma$ obtains the probability value $f(\gamma)$. Thus, when the equation (40) is established, the first and second reflection points A and B determined based on the averaged-state estimate $X_k$ of the a-posteriori state estimates $x_{k|k}$ of the fourth model $M_0$ at the k-th sampling is approximately fixed to the probability value $f(\gamma)$, in other words, the first and second reflection points A and B determined based on the averaged-state estimate $X_k$ of the a-posteriori state estimates $x_{k|k}$ of the fourth model $M_0$ at the k-th sampling correspond to front-end and rear-end reflection points of a single moving object (single forward vehicle).

As described above, the Loving object detection system 1B according to the third embodiment is capable of determining whether the first and second reflection points A and B correspond to front-end and rear-end reflection points of a single moving object (single forward vehicle) without using the first to third assignment hypothesis creators 21 to 23, the first to third trackers 31 to 33, and the first to third averaging modules 41 to 43. The moving object detection system 1B therefore achieves an effect of simplifying the configuration of the moving object detection system 1B, thus reducing the manufacturing cost of the moving object detection system 1B in comparison to the moving object detection system 1.

The first to third embodiments of the present disclosure have been described, but the present disclosure is not limited to them. That is, the present disclosure can be modified or altered within its scope.

As described above, each of the first to fourth trackers 31 to 33 and 36 according to the first embodiment is designed to perform a state estimation task based on the well-known Kalman filter for each of the assignment hypotheses created by a corresponding one of the first to fourth assignment hypothesis creators 21 to 23, and 26 every observation cycle T assuming that the moving direction of forward vehicles is in agreement with that of the vehicle Vm. The present disclosure is however not limited to the situations.

Specifically, if the moving direction of forward vehicles is different from that of the vehicle Vm (see a case of FIG. 6A as an example), each of the moving object detection systems 1, 1A, and 1B can be designed to use the following equations (41) to (44) based on the Kalman filter.

Figure 6A:
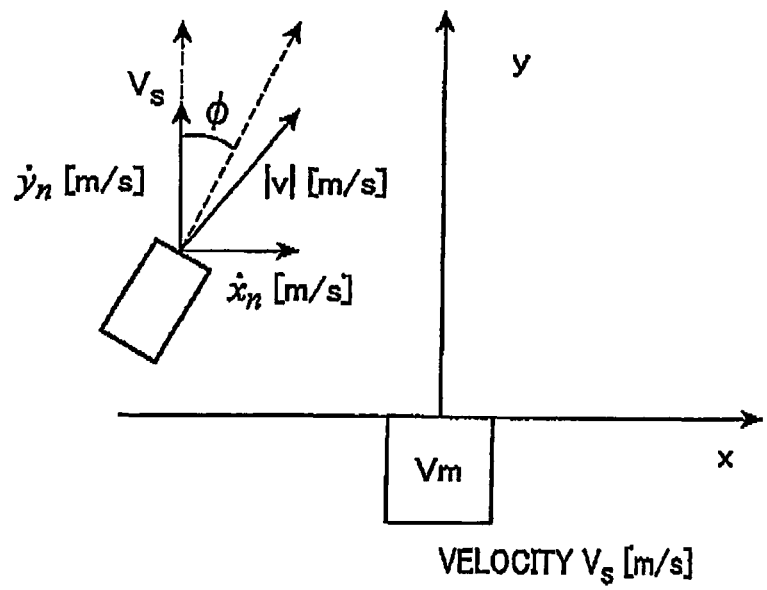
FIG. 6A is a view schematically illustrating a case where the moving direction of a forward moving object is different from that of a vehicle for monitoring the forward moving object according to a modification of the present disclosure.
Figure 6B:
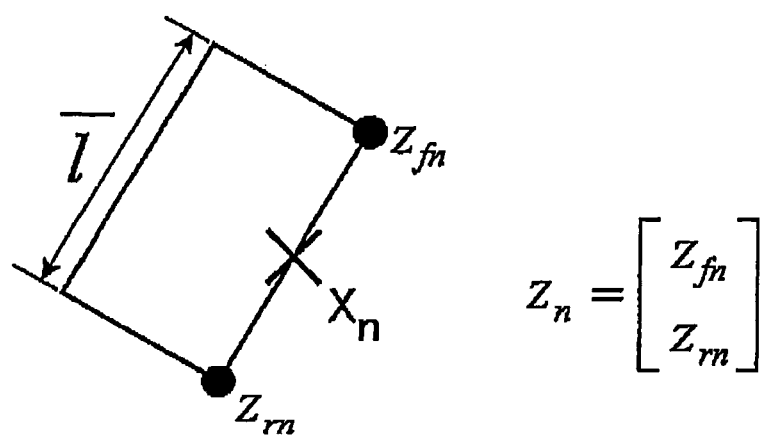
FIG. 6B is a view schematically illustrating a model of forward moving objects in the case according to the modification of the present disclosure.

When a state and velocity vector $x_n$ comprised of the position and velocity of the center of the near side of a rigid body as a model of forward moving objects (forward vehicles), which has a length of l (see FIG. 6B), a front end portion serving as the first reflection point A, and a rear-end portion serving as the second reflection point B, is expressed by the following equation (41):

$$x_n = \begin{bmatrix} x_n \\ y_n \\ \dot{x}_n \\ \dot{y}_n \end{bmatrix} \quad (41)$$

where $x_n$ and $y_n$ are the x and y coordinates of the state vector $x_n$ at the n-th sampling in an x-y coordinate system defined in the vehicle Vm whose x axis is parallel to the horizontal (width) direction of the vehicle Vm; and whose y axis passes the center of gravity of the vehicle Vm and is in parallel to the moving direction of the vehicle Vm (the moving object detection system 1, 1A, 1B. $\dot{x}_n$ represents the velocity component of the state vector $x_n$ at the k-th sampling in the x axis, and $\dot{y}_n$ represents the velocity component of the state vector $x_n$ at the n-th sampling in the y axis. In FIG. 6A, |v| represents the absolute velocity of the model of forward moving objects.

When a traveling angle $\phi_n$ of the model (rigid body) formed between the travelling direction (moving direction, clashed lines in FIG. 6A) of the model and a direction parallel to the y axis and passing the center of the head of the model is expressed by the following equation (42) and process noise $v_n$ is expressed by the following equation (43), the state equation based on the Kalman filter for the state vector $x_n$ is expressed by the following equation (44):

$$\phi_n = \tan^{-1}\left(\frac{\dot{x}_n}{v_s + \dot{y}_n}\right) \quad (42)$$

$$v_n = \begin{bmatrix} v_{xn} \\ v_{yn} \end{bmatrix} \quad (43)$$

$$x_{n+1} = Fx_n + Gv_n = \begin{bmatrix} 1 & T & 0 & 0 \\ 0 & 1 & 0 & 0 \\ 0 & 0 & 1 & T \\ 0 & 0 & 0 & 1 \end{bmatrix} x_n + \begin{bmatrix} T^2/2 & 0 \\ T & 0 \\ 0 & T^2/2 \\ 0 & T \end{bmatrix} v_n \quad (44)$$

where $v_s$ represents the velocity of the vehicle Vm (see FIG. 6A).

When a corresponding assignment hypothesis represents that sampled points are assigned to the first reflection point A and the second reflection point 13, each of the first to fourth trackers 31 to 33 and 36 is designed to use the following first observation equation (45) in place of the equation (24b):

$$z_n = \begin{bmatrix} z_{fn} \\ z_{rn} \end{bmatrix} = H_{bn}x_n + \frac{\overline{l}}{2}\begin{bmatrix} \sin(\phi_n) \\ \cos(\phi_n) \\ -\sin(\phi_n) \\ -\sin(\phi_n) \end{bmatrix} + w_n \quad (45)$$

where $H_{bn}$ is expressed by the following equations (46) and (47), and $w_n$ represents observation noise at the n-th sampling expressed by the following equation (48):

$$H_{bn} = \begin{bmatrix} H \\ H \end{bmatrix} \quad (46)$$

$$H = \begin{bmatrix} 1 & 0 & 0 & 0 \\ 0 & 0 & 1 & 0 \end{bmatrix} \quad (47)$$

$$w_n = \begin{bmatrix} w_{zfxn} \\ w_{zfyn} \\ w_{zrxn} \\ w_{zryn} \end{bmatrix} \quad (48)$$

When a corresponding assignment hypothesis represents that one sampled point is assigned to the first reflection point A but no sampled points are assigned to the second reflection point B, each of the first to fourth trackers 31 to 33 and 36 is designed to use the following second observation equation expressed by the following equation (49) in place of the equation (26):

$$z_n = \lfloor z_{fn} \rfloor = Hx_n + \frac{\overline{l}}{2}\begin{bmatrix} \sin(\phi_n) \\ \cos(\phi_n) \end{bmatrix} + w_n \quad (49)$$

where H is expressed by the following equation (50), and the observation noise $w_n$ at the n-th sampling is expressed by the following equation (51):

$$H = \begin{bmatrix} 1 & 0 & 0 & 0 \\ 0 & 0 & 1 & 0 \end{bmatrix} \quad (50)$$

$$w_n = \begin{bmatrix} w_{zfxn} \\ w_{zfyn} \end{bmatrix} \quad (51)$$

When a corresponding assignment hypothesis represents that one sampled point is assigned to the second reflection point B, but no sampled points are assigned to the first reflection point A, each of the first to fourth trackers 31 to 33 and 36 is designed to use the following third observation equation expressed by the following equation (52) in place of the equation (28):

$$z_n = [z_{rn}] = Hx_n - \frac{\overline{l}}{2}\begin{bmatrix} \sin(\phi_n) \\ \cos(\phi_n) \end{bmatrix} + w_n \quad (52)$$

where H is expressed by the following equation (53), and the observation noise $w_n$ at the n-th sampling is expressed by the following equation (54):

$$H = \begin{bmatrix} 1 & 0 & 0 & 0 \\ 0 & 0 & 1 & 0 \end{bmatrix} \quad (53)$$

$$w_n = \begin{bmatrix} w_{zrxn} \\ w_{zryn} \end{bmatrix} \quad (54)$$

In each of the first to third embodiments and their modifications, the radar device 2 and the reflection-point sampling module 10 serve as a detecting module and a sampling module of a first aspect of the present disclosure, and the assignment hypothesis creator group 20, the tracker group 30, the averaging group 40, the first selector 50, and the second selector 60 serve as the first determining module of the first aspect of the present disclosure. In each of the first to third embodiments and their modifications, the second selector 60 serves as a second determining module of the first aspect of the present disclosure. In each of the first to third embodiments and their modifications, the first to third assignment hypothesis creators 21 to 23, the first to third trackers 31 to 33, the averaging modules 41 to 43, and the first selector 50 serve as a first calculating module of the first aspect of the present disclosure, and the fourth assignment hypothesis creator 26, the fourth tracker 36, and the second selector 60 serves as a second calculating module of the first aspect of the present disclosure. In each of the first to third embodiments and their modifications, the first selector 50 and the second selector 60 serve as an evaluating module of the first aspect of the present disclosure, and the second selector 60 serves as a determining module of the first aspect of the present disclosure.

In each of the first to third embodiments and their modifications, the radar device 2 and the reflection-point sampling module 10 serve as a detecting module and a sampling module of a second aspect of the present disclosure. In each of the first to third embodiments and their modifications, the first to third assignment hypothesis creators 21 to 23, the first to third trackers 31 to 33, the averaging modules 41 to 43, and the selector 50 serve as a first calculating module of the second aspect of the present disclosure. In each of the first to third embodiments and their modifications, the fourth assignment hypothesis creator 26, the fourth tracker 36, and the second selector 60 serves as a second calculating module of the second aspect of the present disclosure. In each of the first to third embodiments and their modifications, the second selector 60 serves as a determining module of the second aspect of the present disclosure.

While illustrative embodiments of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A moving object detection system for transmitting a search wave and detecting moving objects in front thereof from received echoes based on the search wave, each of the moving objects having a front end portion and a rear end portion in a moving direction of the moving object, the moving object detection system comprising:
   a detecting module configured to cyclically detect, from the received echoes, positional information of reflection points of the received echoes;
   a sampling module configured to cyclically sample, from the detected reflection points for each cycle, a first reflection point and a second reflection point, the first and second reflection points being expected to be reflection points of the respective front and rear end portions of a moving object in front of the moving object detection system;
   a first determining module configured to determine whether a distance between the first reflection point and the second reflection point varies over time; and
   a second determining module configured to determine that the first and second reflection points correspond to reflection points of the respective front and rear end portions of a single moving object in front of the moving object detection system when it is determined that the distance between the first reflection point and the second reflection point is invariant over time.

2. The moving object detection system according to claim 1, wherein the first determining module comprises:
   a first calculating module configured to calculate, at a current cycle, an estimation of positional information of each of the first and second reflection points with a first scenario that the distance between the first reflection point and the second reflection point is fixed to a value, and calculate a first probability that a first value of the positional information of each of the first and second reflection points detected by the detecting module at the next cycle is assigned to a reflection point of a corresponding one of the front and rear end portions based on the calculated estimation of the positional information of a corresponding one of the first and second reflection points in the first scenario;
   a second calculating module configured to calculate, at the current cycle, an estimation of positional information of each of the first and second reflection points with a second scenario that the distance between the first reflection point and the second reflection point varies over time, and calculate a second probability that a second value of the positional information of each of the first and second reflection points detected by the detecting module at the next cycle is assigned to a reflection point of a corresponding one of the front and rear end portions based on the calculated estimation of the positional information of a corresponding one of the first and second reflection points in the second scenario;
   an evaluating module configured to evaluate the first scenario based on the first probability, and evaluates the second scenario based on the second probability; and
   a third determining module configured to compare a first result of the evaluation of the first scenario with a second result of the evaluation of the second scenario, and determine whether the distance between the first reflection point and the second reflection point varies over time based on a result of the comparison.

3. The moving object detection system according to claim 2, wherein the first calculating module is configured to:
   calculate, at the current cycle, an estimation of the positional information of each of the first and second reflection points for each of a plurality of first scenarios as the first scenario, the plurality of first scenarios respectively having different values as the value to which the distance between the first reflection point and the second reflection point is fixed; and
   calculate the first probability that the first value of the positional information of each of the first and second reflection points detected by the detecting module at the next cycle for each of the plurality of first scenarios is assigned to a reflection point of a corresponding one of the first and second reflective portions based on the calculated estimation of the positional information of a corresponding one of the first and second reflection points in a corresponding one of the first scenarios, and
   the evaluating module is configured to evaluate each of the plurality of the first scenarios based on the first probability for a corresponding one of the plurality of first scenarios.

4. The moving object detection system according to claim 1, wherein it is assumed that: a moving direction of the moving object detection system is referred to as a direction of y coordinates, a coordinate of the first reflection point in the direction of y coordinates at a t-th cycle where t is an integer equal to or greater than 1 is referred to $y_{1t}$, an error variance of the coordinate $y_{1t}$ is referred to as $\sigma_{1t}^2$, a coordinate of the second reflection point in the direction of y coordinates at the t-th cycle is referred to $y_{2t}$, an error variance of the coordinate $y_{2t}$ is referred to as $\sigma_{2t}^2$, and the coordinates $y_{1t}$ and $y_{2t}$ are assumed to be represented by the following equations (1) and (2):

$$y_{1t} \sim N(\bar{y}_{1t}, \sigma_{1t}^2) \tag{1}$$

$$y_{2t} \sim N(\bar{y}_{2t}, \sigma_{2t}^2) \tag{2}$$

and wherein the first determining module is configured to determine that the distance between the first reflection point and the second reflection point varies over time at a k-th cycle where k is an integer equal to or greater than 1 as long as the following equations (3) and (4) are established:

$$f(\gamma) = \int_{-\infty}^{\gamma} \chi_N^2(\alpha) d\alpha \tag{3}$$

$$\sum_{t=1}^{k} \frac{(y_{1t} - y_{2t})}{(\sigma_{1t}^2 + \sigma_{2t}^2)} < f^{-1}(\gamma) \tag{4}$$

where $\chi_N^2(\alpha)$ represents a probability density function of a chi-square distribution, $f(\gamma)$ represents a probability value, and $f^{-1}(\gamma)$ represents an inverse function of the probability value $f(\gamma)$.

5. A moving object detection system for transmitting a search wave and detecting moving objects in front thereof from received echoes based on the search wave, each of the moving objects having a front end portion and a rear end portion in a moving direction thereof, the moving object detection system comprising:
a detecting module configured to cyclically detect, from the received echoes, positional information of reflection points of the received echoes;
a sampling module configured to cyclically sample, from the detected reflection points for each cycle, a first reflection point and a second reflection point, the first and second reflection points being expected to be reflection points of the respective front and rear end portions of a moving object in front of the moving object detection system;
a first calculating module configured to produce a first scenario that a distance between the first reflection point and the second reflection point is fixed to a value, and calculate a first likelihood of the first scenario;
a second calculating module configured to produce a second scenario that the distance between the first reflection point and the second reflection point varies over time, and calculate a second likelihood of the second scenario; and
a determining module configured to determine whether the first likelihood is greater than the second likelihood, and determine that the first and second reflection points correspond to reflection points of the respective front and rear end portions of a single moving object in front of the moving object detection system when it is determined that the first likelihood is greater than the second likelihood.

6. The moving object detection system according to claim 5, wherein:
the first calculating module is configured to calculate, at a current cycle, an estimation of positional information of each of the first and second reflection points for the first scenario, calculate a first probability that a first value of the positional information of each of the first and second reflection points detected by the detecting module at the next cycle is assigned to a reflection point of a corresponding one of the first and second reflective portions based on the calculated estimation of the positional information of a corresponding one of the first and second reflection points in the first scenario, and calculates the first likelihood of the first scenario based on the calculated first probability; and
the second calculating module is configured to calculate, at the current cycle, an estimation of positional information of each of the first and second reflection points for the second hypothesis, calculate a second probability that a second value of the positional information of each of the first and second reflection points detected by the detecting module at the next cycle is assigned to a reflection point of a corresponding one of the front and rear end portions based on the calculated estimation of the positional information of a corresponding one of the first and second reflection points in the second scenario, and calculate the second likelihood of the second scenario based on the calculated second probability.

7. The moving object detection system according to claim 6, wherein the first calculating module is configured to:
calculate, at the current cycle, an estimation of the positional information of each of the first and second reflection points for each of a plurality of first scenarios as the first scenario, the plurality of first scenarios respectively having different values as the value to which the distance between the first reflection point and the second reflection point is fixed;
calculate the first probability that the first value of the positional information of each of the first and second reflection points detected by the detecting module at the next cycle for each of the plurality of first scenarios is assigned to a reflection point of a corresponding one of the first and second reflective portions based on the calculated estimation of the positional information of a corresponding one of the first and second reflection points in a corresponding one of the first scenarios; and
calculate the first likelihood for each of the plurality of the first scenarios based on the first probability for a corresponding one of the plurality of first scenarios.

\* \* \* \* \*